(12) United States Patent
Kishi

(10) Patent No.: US 7,460,719 B2
(45) Date of Patent: Dec. 2, 2008

(54) IMAGE PROCESSING APPARATUS AND METHOD OF ENCODING IMAGE DATA THEREFOR

(75) Inventor: Hiroki Kishi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1016 days.

(21) Appl. No.: 10/752,896

(22) Filed: Jan. 6, 2004

(65) Prior Publication Data

US 2004/0141653 A1    Jul. 22, 2004

(30) Foreign Application Priority Data

Jan. 10, 2003    (JP)    ............... 2003-004946

(51) Int. Cl.
*G06K 9/36*    (2006.01)
*G06K 9/46*    (2006.01)

(52) U.S. Cl. .................. 382/233; 382/239; 382/240

(58) Field of Classification Search .................. None
See application file for complete search history.

(56) References Cited

U.S. PATENT DOCUMENTS

| 5,142,362 A | * | 8/1992 | Masera et al. | .......... 375/240.01 |
| 6,020,923 A | * | 2/2000 | Hosaka et al. | .......... 375/240.12 |
| 6,075,559 A | * | 6/2000 | Harada | .......... 348/148 |
| 6,587,505 B1 | | 7/2003 | Nozawa et al. | .......... 375/240 |
| 6,587,885 B1 | * | 7/2003 | Nakayama et al. | .......... 709/236 |
| 6,956,971 B1 | * | 10/2005 | Cho et al. | .......... 382/236 |

FOREIGN PATENT DOCUMENTS

| JP | 2000-209587 | * | 7/2000 |
| JP | 2000-333130 | | 11/2000 |
| JP | 2001-16583 | * | 1/2001 |
| JP | 2002-044531 | | 2/2002 |

OTHER PUBLICATIONS

JPO machine translation of JP2000-209587.*
Nozawa, JP2001-16583 application No. 11-184211, machine translation from JPO.*
Fukuhara et al, Motion-JPEG2000 standardization and target market, Proceedings of 2000 International Conference on Image Processing, vol. 2, pp. 57-60, 2000.*
Japanese Office Action dated Feb. 29, 2008 for Japanese Patent Application No.: 2003-004946, which is the foreign counterpart of the present application. (Copy in Japanese Language and in English therefor are provided).

\* cited by examiner

*Primary Examiner*—Matthew C Bella
*Assistant Examiner*—Yuzhen Ge
(74) *Attorney, Agent, or Firm*—Morgan & Finnegan, LLP

(57) ABSTRACT

An image processing apparatus and method in which moving picture part data, which is used as a moving picture frame, and remaining difference data is generated from the data of a still picture frame, and the moving picture part data is used conjointly for reproducing the moving picture frame and the still picture frame, thereby making it possible to efficiently encode image data in which a still picture frame of a quality higher than that of a moving picture frame is mixed in moving picture data composed of successive moving picture frames.

12 Claims, 31 Drawing Sheets

LEVEL0 : LL
LEVEL1 : HL1, HH1, LH1
LEVEL2 : HL2, HH2, LH2
LEVEL3 : HL3, HH3, LH3

FIG. 4

| FREQUENCY COMPONENT | QUANTIZATION STEP |
|---|---|
| LL | 1 |
| HL1 | 2 |
| HH1 | 2 |
| LH1 | 2 |
| HL2 | 4 |
| HH2 | 4 |
| LH2 | 4 |
| HL3 | 8 |
| HH3 | 8 |
| LH3 | 8 |

FIG. 29

| FREQUENCY COMPONENT | QUANTIZATION STEPS OF STILL PICTURE FRAME | QUANTIZATION STEPS OF MOVING PICTURE FRAME |
|---|---|---|
| LL | 1 | 2 |
| HL3 | 2 | 4 |
| HH3 | 2 | 4 |
| LH3 | 2 | 4 |
| HL2 | 4 | |
| HH2 | 4 | |
| LH2 | 4 | |
| HL1 | 8 | |
| HH1 | 8 | |
| LH1 | 8 | |

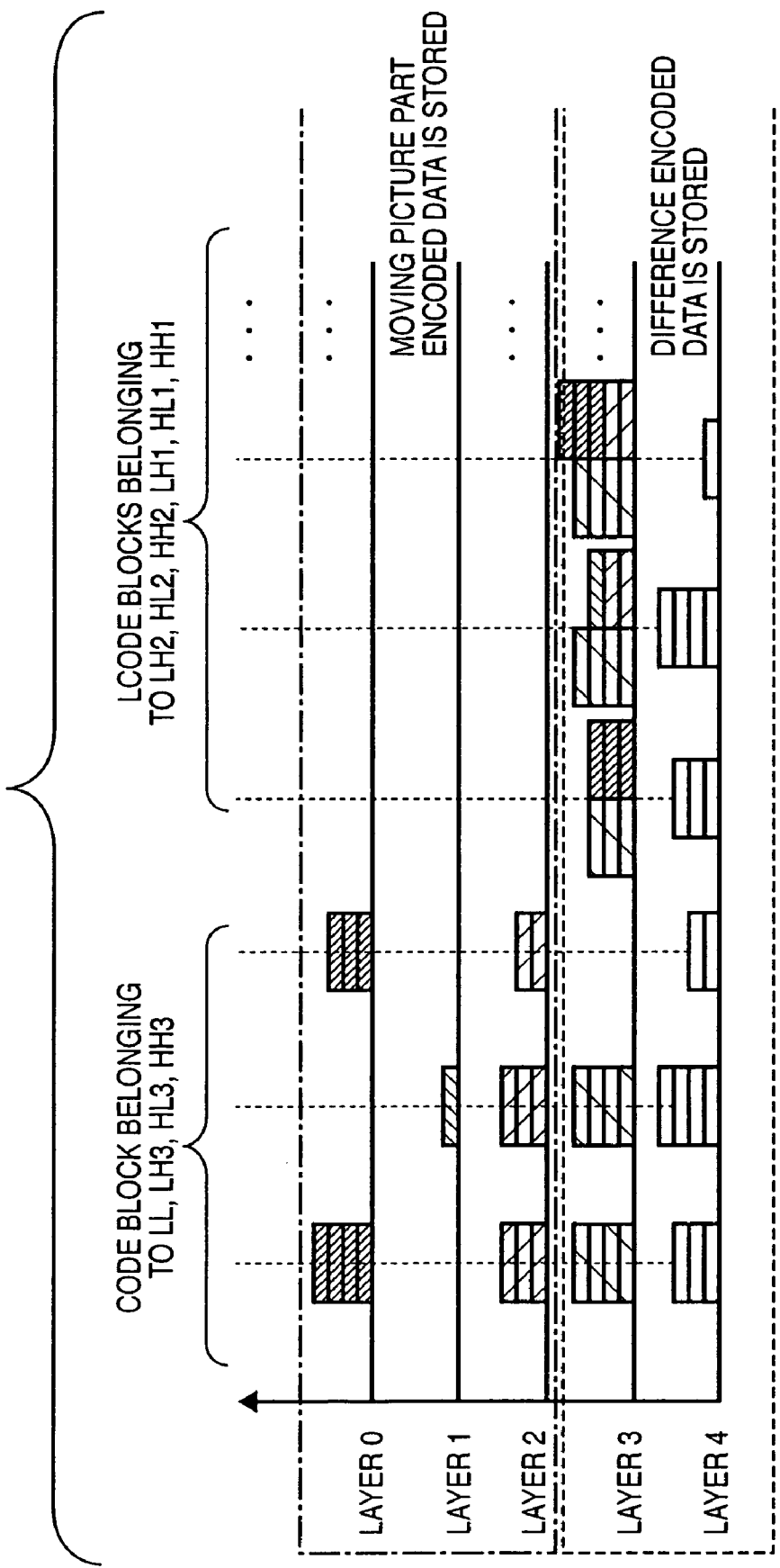

IMAGE PROCESSING APPARATUS AND METHOD OF ENCODING IMAGE DATA THEREFOR

FIELD OF THE INVENTION

This invention relates to a technique for efficiently encoding/decoding image data that is a mixture of moving and still pictures.

BACKGROUND OF THE INVENTION

Digital cameras are being produced with higher definition (numbers of pixels) and at lower cost and are becoming increasingly popular. There are many of these products that have various additional functions besides a still-photography function and these additional functions are accelerating further the spread of digital cameras.

One additional function of a digital camera is a function for taking moving pictures. This function is one that is extremely attractive to users and manufacturers are now equipping many consumer products with a moving-picture function.

It is predicted that manufacturers will consider expanding the moving-picture function with a view to differentiating their products over those of other manufacturers. For example, a special still picture taking function that makes it possible to take a still picture during the shooting of a moving picture, as illustrated in FIG. 24, is conceivable as a function that is an expansion of the moving-image function.

It is believed that such an expansion of the moving-picture function will cause users to take a deeper interest in the shooting of moving pictures and provide users with greater opportunities to shoot moving pictures with a digital camera. On the other hand, digital cameras have been desired conventionally with the shooting of still pictures in mind and do not take into consideration the utilization of a storage medium having a large storage capacity. The storage capacity of a storage medium with which a digital camera can be equipped is on the order of several hundred megabytes to one gigabyte. In addition, large-capacity storage media are expensive and are not a realistic option for ordinary users of digital cameras. The storage capacity of storage media actually in use is considered to be about 100 MB at most.

In view of these circumstances, it can readily be predicted that an increase in moving picture photography using digital cameras will lead to the problem of inadequate storage capacity of the storage media loaded into (or built in) such cameras.

SUMMARY OF THE INVENTION

Accordingly, an object of the present invention is to provide an image processing apparatus for efficiently encoding/decoding image data that is a mixture of moving and still pictures.

Another object of the present invention is to provide an image processing apparatus for decoding image data that has been encoded by the image processing apparatus of this invention.

According to the present invention, the foregoing objects at attained by providing an image processing apparatus for encoding image data in which a still picture frame of an image quality higher than a prescribed imaging quality is mixed in moving picture data composed of successive moving picture frames having the prescribed imaging quality, comprising: first encoding means for encoding the moving picture frames in the moving picture data and, with regard to the still picture frame in the moving picture data, generating moving picture part data, which has a quality equivalent to that of moving picture frames, from the still picture frame and encoding the moving picture part data, thereby generating moving picture encoded data; second encoding means for encoding difference data, which is the result of removing the moving picture part data from the still picture frame; additional-information generating means for generating correspondence information, which correlates the moving picture part data and corresponding difference data, and identification information for specifying the moving picture part data contained in the moving picture encoded data; and output means for outputting the moving picture frame encoded data, the difference encoded data, the correspondence information and the identification information as result of encoding the moving picture data.

According to another aspect of the present invention, the foregoing objects at attained by providing an image processing system comprising a first image processing apparatus for encoding image data in which a still picture frame of an image quality higher than a prescribed imaging quality is mixed in moving picture data composed of successive moving picture frames having the prescribed imaging quality, and a second image processing apparatus for decoding encoded data that has been generated by the first image processing apparatus, wherein the first image processing apparatus includes: first encoding means for encoding the moving picture frames in the moving picture data and, with regard to the still picture frame in the moving picture data, generating moving picture part data, which has a quality equivalent to that of moving picture frames, from the still picture frame and encoding the moving picture part data, thereby generating moving picture encoded data; second encoding means for encoding difference data, which is the result of removing the moving picture part data from the still picture frame; additional-information generating means for generating correspondence information, which correlates the moving picture part data and corresponding difference data, and identification information for specifying the moving picture part data contained in the moving picture encoded data; output means for outputting the moving picture frame encoded data, the difference encoded data, the correspondence information and the identification information as result of encoding the moving picture data; and the second image processing apparatus includes: first decoding means for decoding the moving picture frame encoded data and reproducing moving picture frame and moving picture part data; second decoding means for decoding the difference encoded data; searching means, which is responsive to an externally entered command to display a still picture, for searching for the moving picture part data contained in the moving picture frame encoded data based upon the identification information; and still picture frame reproducing means for reproducing a still picture frame using the moving picture part data retrieved and difference data, which corresponds to this moving picture part data, retrieved based upon the identification information.

According to still another aspect of the present invention, the foregoing objects at attained by providing an image processing method for encoding image data in which a still picture frame of an image quality higher than a prescribed imaging quality is mixed in moving picture data composed of successive moving picture frames having the prescribed imaging quality, comprising: a first encoding step of encoding the moving picture frames in the moving picture data and, with regard to the still picture frame in the moving picture data, generating moving picture part data, which has a quality equivalent to that of moving picture frames, from the still picture frame and encoding the moving picture part data, thereby generating moving picture encoded data; a second encoding step of encoding difference data, which is the result of removing the moving picture part data from the still picture frame; an additional-information generating step of generating correspondence information, which correlates the moving picture part data and corresponding difference data, and identification information for specifying the moving picture part data contained in the moving picture encoded data; and an output step of outputting the moving picture frame encoded data, the difference encoded data, the correspondence information and the identification information as result of encoding the moving picture data.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 is a diagram useful in describing quantization steps;

FIG. 29 is a diagram illustrating quantization steps used in the third embodiment;

FIG. 31 is a diagram useful in describing a layer structure according to the third embodiment.

DESCRIPTION OF THE PREFERRED EMBODIMENTS

Figure 1:
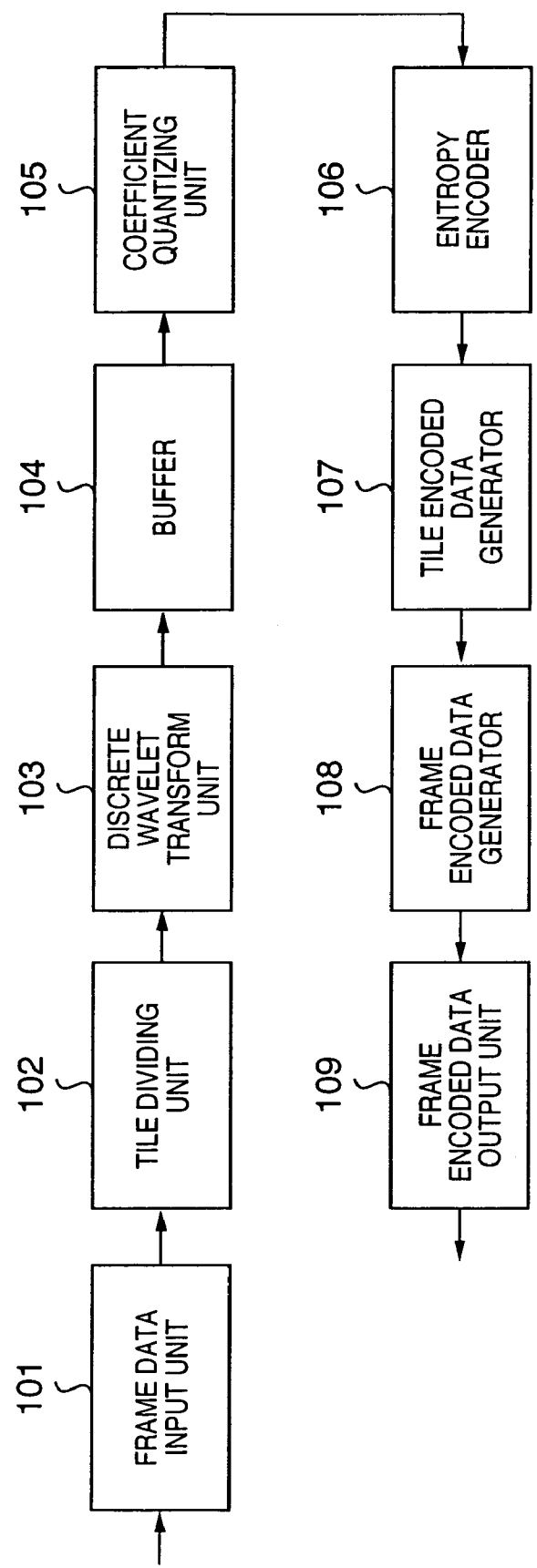
FIG. 1 is a block diagram illustrating an example of the functional structure of a JPEG-2000-compliant encoder according to a first embodiment of the present invention.

Preferred embodiments of the present invention will now be described in detail in accordance with the accompanying drawings.

An image processing apparatus according to the present invention is for encoding image data in which a still picture frame of an image quality higher than a prescribed imaging quality is mixed in moving picture data composed of successive moving picture frames having the prescribed imaging quality. The image processing apparatus comprises a first encoder for encoding the moving picture frames in the moving picture data and, with regard to the still picture frame in the moving picture data, generating moving picture part data, which has a quality equivalent to that of moving picture frames, from the still picture frame and encoding the moving picture part data, thereby generating moving picture encoded data; a second encoder for encoding difference data, which is the result of removing the moving picture part data from the still picture frame; an additional-information generating unit for generating correspondence information, which correlates the moving picture part data and corresponding difference data, and identification information for specifying the moving picture part data contained in the moving picture encoded data; and an output unit for outputting the moving picture frame encoded data, difference encoded data, correspondence information and identification information as result of encoding the moving picture data.

The present invention as described above can be implemented in embodiments below in structure and processing illustrated in the drawings accompanying this application.

Preferred embodiments of the present invention will now be described in detail with reference to the accompanying drawings.

First Embodiment

In general, a still picture requires a higher quality than one frame contained in a moving picture. The reason for this is that owing to the need for real-time decoding of a moving picture and the large amount of storage capacity used for storing the moving picture, the amount of code allocated to one frame of a moving picture is small, as a result of which the image quality of one frame is much lower than the image quality of a still picture.

In view of the foregoing, many digital cameras that are capable of taking both still pictures and moving pictures are adapted in such a manner that the number of pixels can be changed between a certain number when a still picture is taken and another number when a moving picture is taken.

A digital camera having a special still-picture taking capability will be described below as an embodiment of an image processing apparatus according to the present invention. In this digital camera, the number of pixels used when a still picture is taken is made different from that when a moving picture is taken, and a low-resolution image of a still picture is used as one frame of a moving picture. By this sharing of data between still and moving pictures, a reduction in required memory is achieved in the digital camera of this embodiment.

In this embodiment, it is assumed that image data of 2048× 1536 pixels is dealt with as a still picture frame and that image data of 512×384 pixels is dealt with as a moving picture frame.

Figure 25:
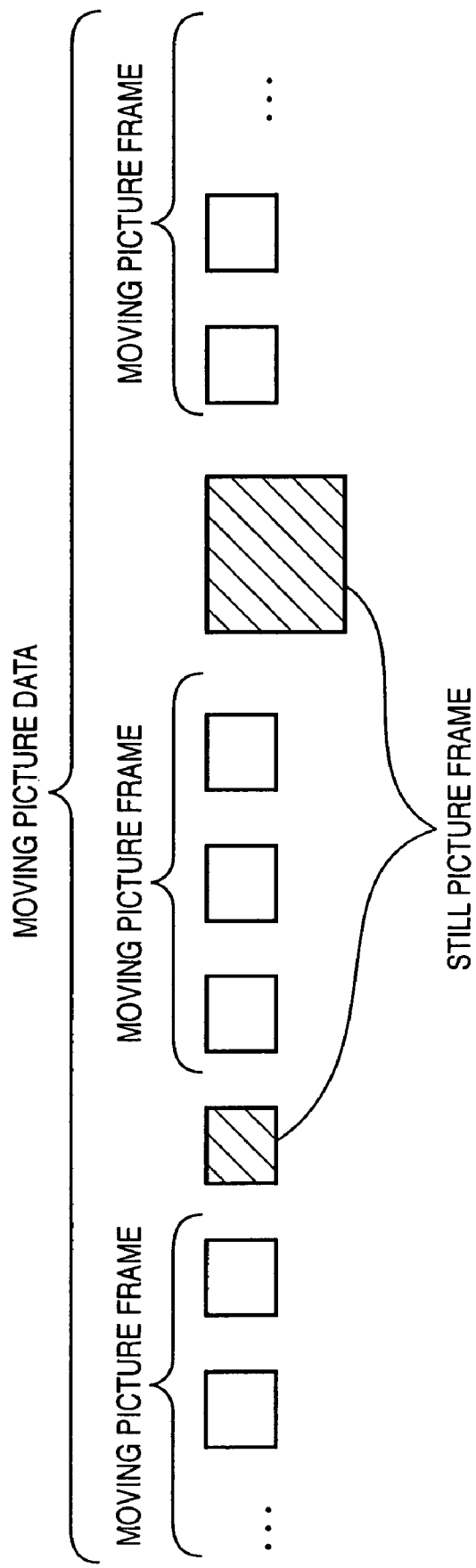
FIG. 25 is a diagram for describing terms used in this specification.
Figure 26:
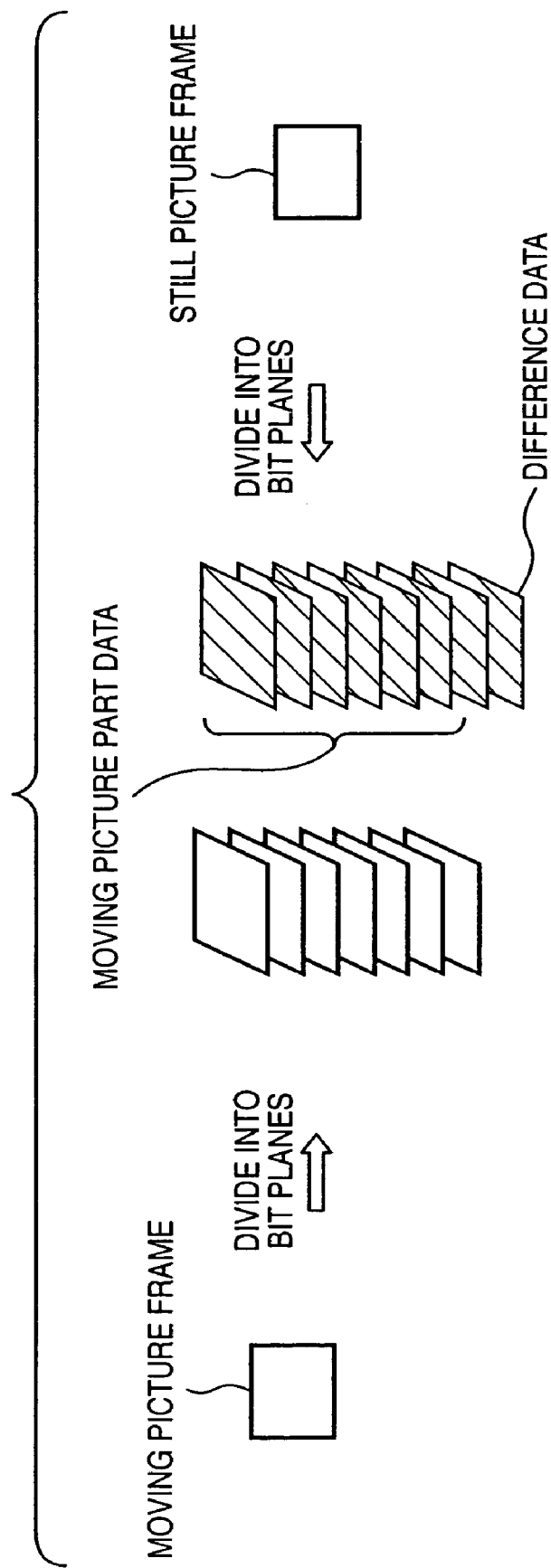
FIG. 26 is a diagram useful in describing moving picture part data and difference data in a second embodiment.

The terms defined below are used in the description that follows. Further, FIG. 25 is a diagram useful in describing some of these terms.

Moving picture data: entered data representing a moving picture
Still picture frame: a frame captured also as still picture in moving picture data
Moving picture frame: a frame other than a still picture frame in moving picture data
Moving picture part data: data utilized also as a moving picture in a still picture frame
Difference data: data other than moving picture part data in a still picture frame
Still picture frame encoded data: a still picture frame that has been encoded
Moving picture part encoded data: moving picture part data that has been encoded
Difference encoded data: difference data that has been encoded
(Moving picture) frame encoded data: a moving-picture frame that has been encoded
Moving picture encoded data: data composed of moving picture frame encoded data and moving picture part encoded data <1. Overview of Generation of Moving Picture Encoded Data>

An example of a photographic recording apparatus and processing for creating moving picture encoded data will now be described in simple terms.

Figure 17:
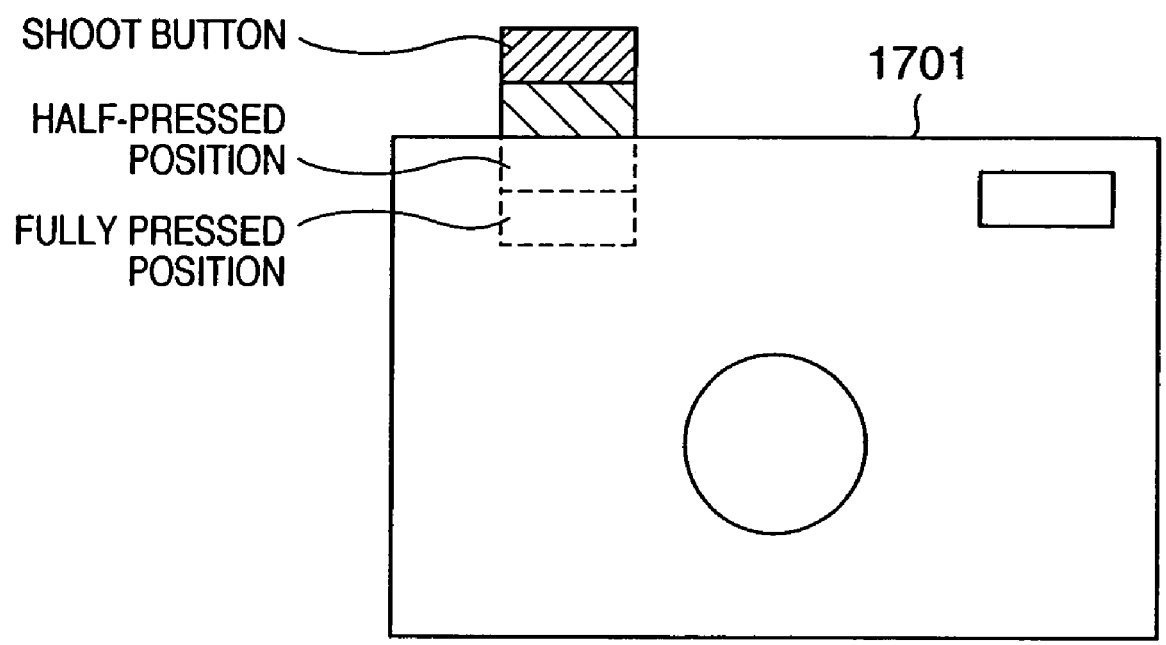
FIG. 17 is a schematic view of a digital camera embodying an image processing apparatus according to the present invention.

FIG. 17 is a schematic view of a digital camera that is capable for shooting moving pictures. Though the details are well known and are not described here, a digital camera 1701 is assumed to be so adapted that it can shoot moving pictures at 30 frames per second in response to pressing of a shoot button and can take still pictures in response to re-pressing of the shoot button during moving picture photography.

Figure 18:
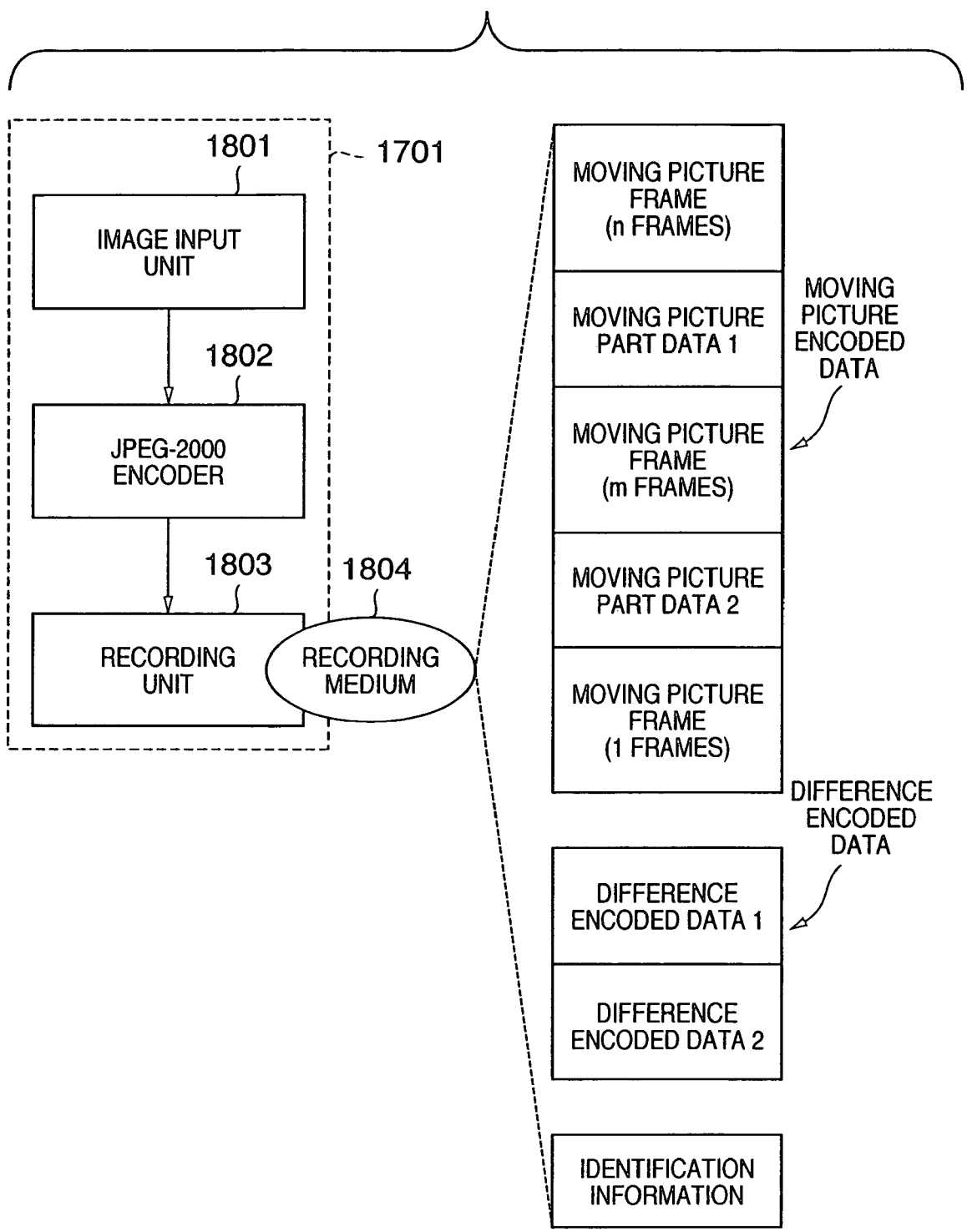
FIG. 18 is a diagram illustrating functional blocks relating to the recording of an image in the digital camera of FIG. 17, and showing a recording format schematically.

FIG. 18 is a diagram illustrating functional blocks relating to the recording of an image in the digital camera 1701, and showing a recording format schematically. The image of each frame shot by the above method is generated on a per-frame basis from an image input unit 1801 such as an image sensing device. The image of each frame is encoded independently frame by frame in an encoder 1802 that is compliant with JPEG 2000. The details of the encoding scheme of this JPEG-2000-compliant encoder will be described later.

The thus encoded data of each frame is recorded on a recording medium 1804 in time-series order by a recording unit 1803. Generated in this moving picture encoded data is information specifying an address at which a still picture frame exists (namely the leading address of moving picture part encoded data) and information identifying difference encoded data that corresponds to an i-th still picture frame in the difference encoded data. Identification information that is the result of unifying these two items of information is generated.

The above-mentioned identification information is input to the recording unit 1803 by monitoring a control signal from the image input unit 1801 or a control signal from the shoot button on the digital camera 1701. Along with moving picture encoded data and difference encoded data, this identification information also is recorded on the recording medium. By virtue of this identification information, which frame in moving picture encoded data is a still picture frame can be ascertained when decoding is carried out. In addition, it is possible to correlate any still picture frame with corresponding difference encoded data.

Figure 22:
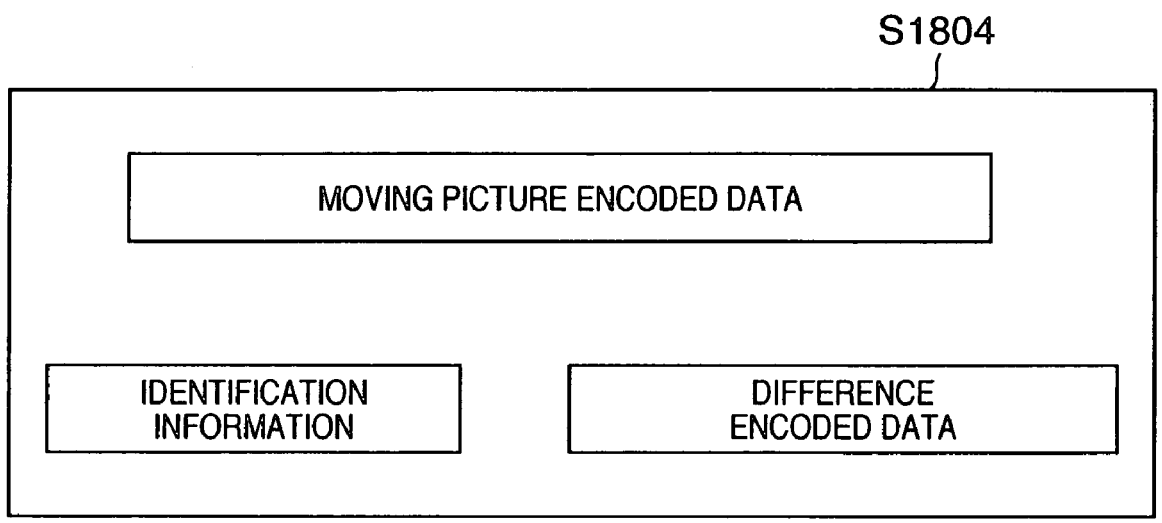
FIG. 22 is a diagram illustrating an example of the state of stored data generated by the image processing apparatus of the present invention.

As shown in FIG. 22, the moving picture encoded data is recorded successively on the recording medium 1804, and the identification information is recorded successively on the recording medium 1804 in a different area thereof.

<Overview of Encoding Method According to JPEG 2000>

Figure 2:
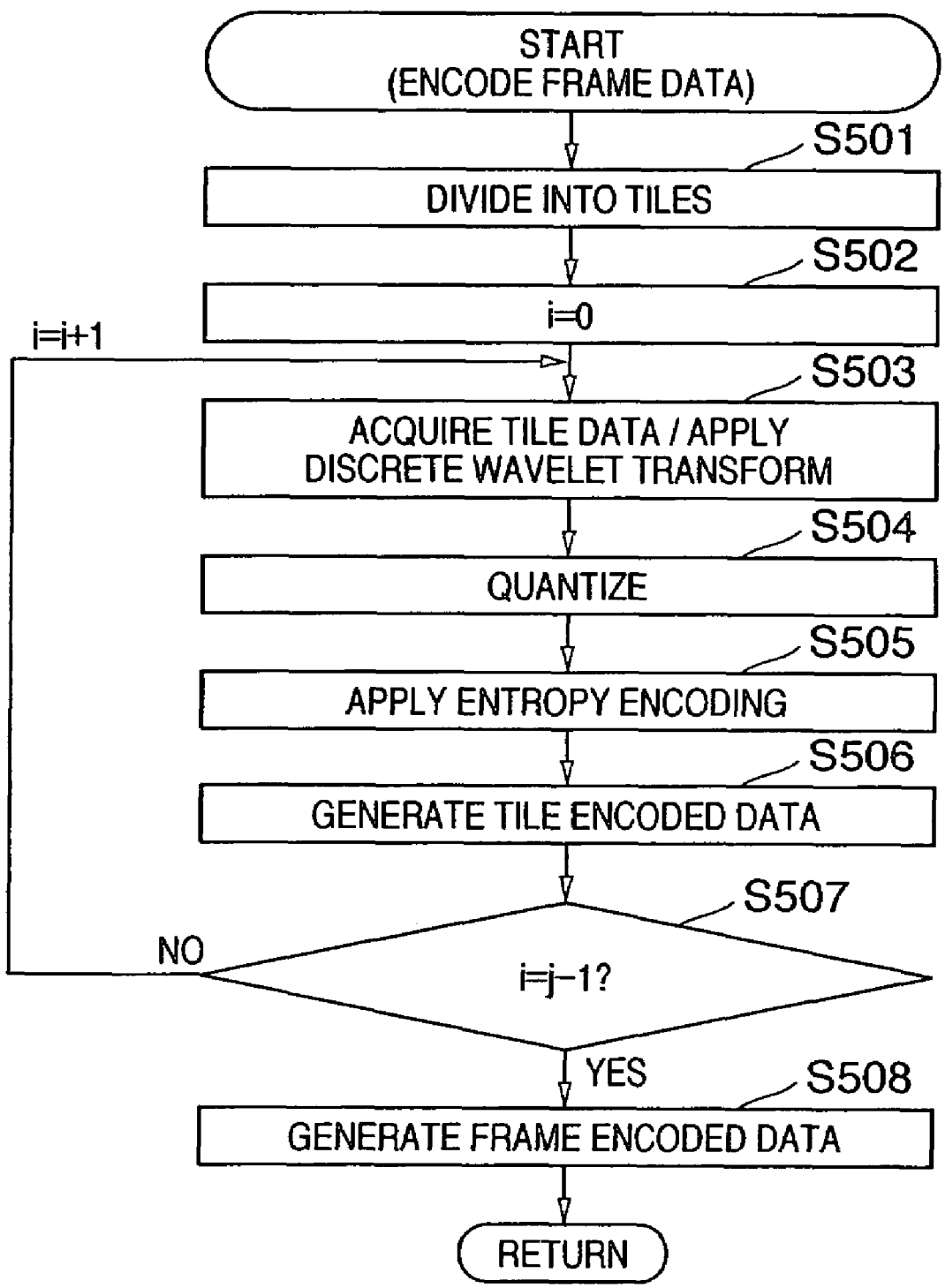
FIG. 2 is a flowchart for describing encoding processing executed by the JPEG-2000-compliant encoder according to the first embodiment of the present invention.

Next, frame-data encoding processing according to JPEG 2000 used in this embodiment will be described with reference to FIG. 1, which is a block diagram of the JPEG-2000 encoder 1802, and FIG. 2, which is a flowchart illustrating processing executed by the JPEG-2000 encoder 1802. For further details concerning a method of creating a header, etc., refer to the ISO/IEC Recommendations.

It will be assumed that frame data to be encoded in this embodiment is monochrome data of eight bits per pixel. However, the method described below is also applicable to a monochrome image represented by numbers of bits other than eight bits per pixel, e.g., 4, 10 or 12 bits per pixel, etc., and to multivalued frame data of colors in which each color component (RGB/Lab/YCrCb) of each pixel is expressed by eight bits. Further, the method is also applicable to multivalued information indicating the state, etc., of each pixel constructing an image, e.g., to multivalued index values representing the color of each pixel. In the case of these applications, the multivalued information of each type need only be made monochrome frame data, described later.

First, pixel data constructing frame data to be encoded is input from the image input unit 1801 to a frame data input unit 101 in the order of raster scanning, and is output to a tile dividing unit 102.

Figure 12:
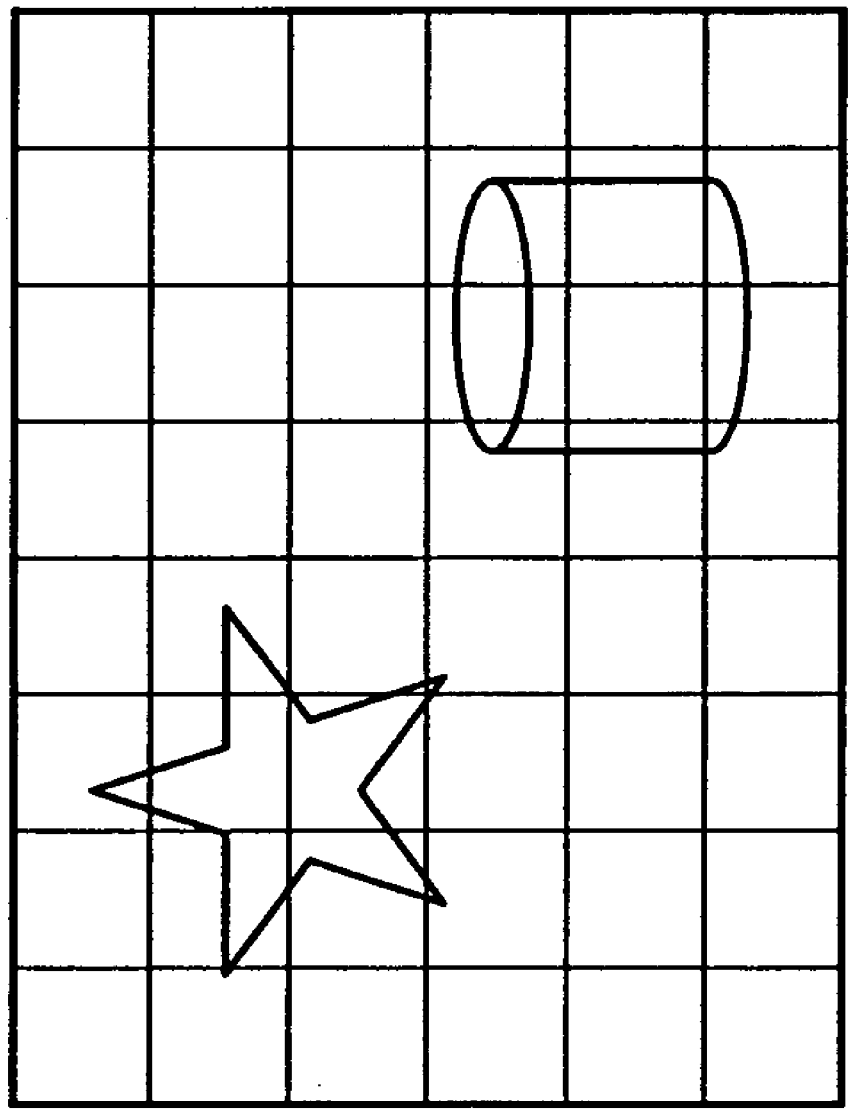
FIG. 12 is a diagram useful in describing division into tiles.

The tile dividing unit 102 divides a single image that enters from the frame data input unit 101 into j-number of tiles (step S501) and assigns tile numbers i=0, 1, 2, ..., j−1 in the order of raster scanning in order to identify each tile. In this embodiment, as shown in FIG. 12, it is assumed that the image is divided into eight tiles horizontally and six tiles vertically to thereby create 48 tiles (i.e., j=48).

Data representing each tile shall be referred to as "tile data". The items of tile data generated are sent to a discrete wavelet transform unit 103 in order. In processing executed by the discrete wavelet transform unit 103 and subsequent blocks, it will be assumed that tiles are encoded independently. Further, a counter (not shown) for recognizing a tile being processed by the JPEG-2000 encoder 1802 is set to zero (step S502).

The discrete wavelet transform unit 103 executes a discrete wavelet transform (step S503) using data (reference-pixel data) of a plurality of pixels (reference pixels) in one item of tile data x(n), which is contained in one still picture (frame), that enters from the tile dividing unit 102.

Frame data after application of the discrete wavelet transform (coefficients of the discrete wavelet transform) is indicated by the following:

$$Y(2n)=X(2n)+\text{floor}\{[Y(2n-1)+Y(2n+1)+2]/4\}$$

$$Y(2n+1)=X(2n+1)-\text{floor}\{[X(2n)+X(2n+2)]/2\}$$

Figure 13:
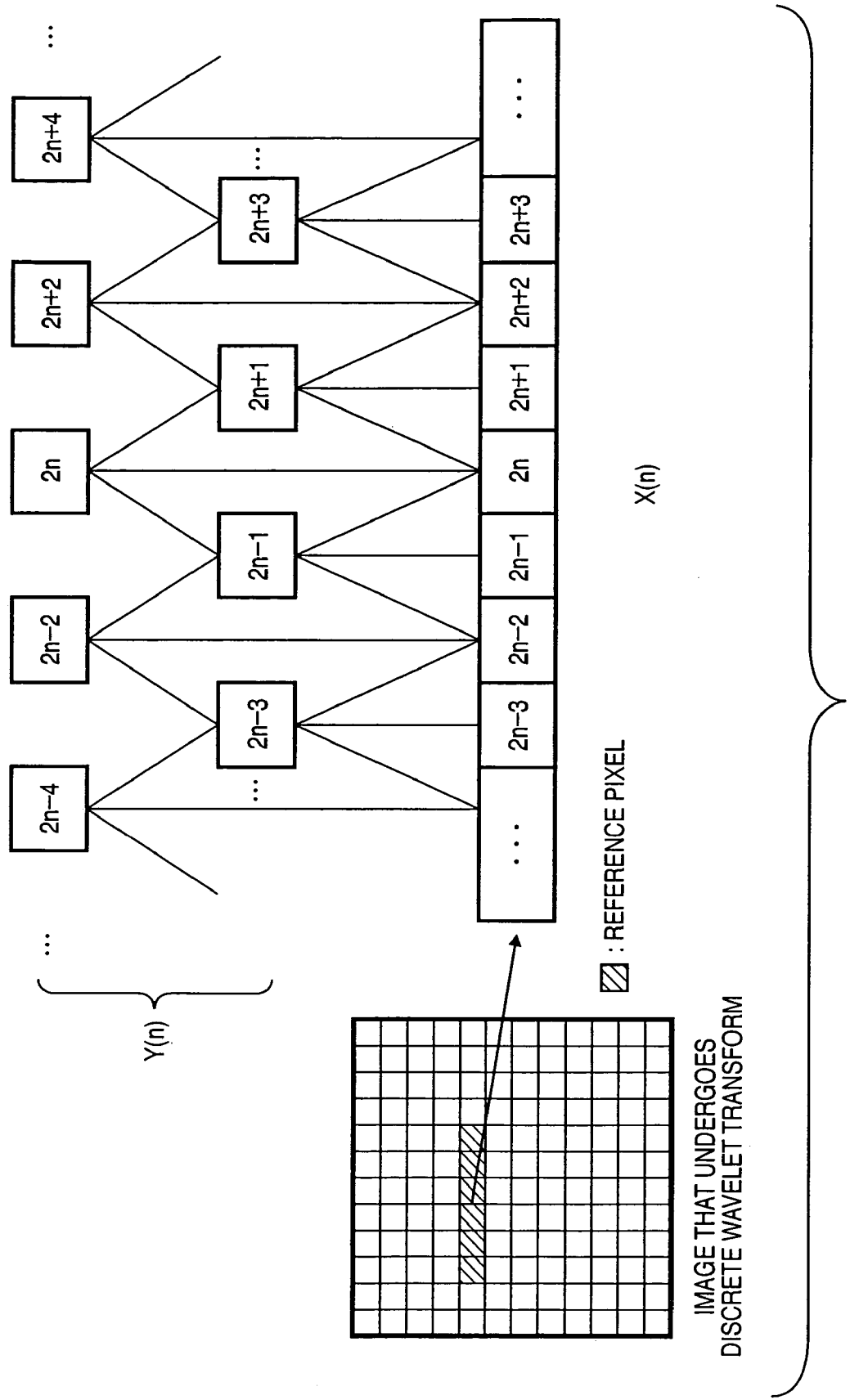
FIG. 13 is a diagram useful in describing a one-dimensional discrete wavelet transform.

Here Y(2n), Y(2n+1) represent coefficient sequences of the discrete wavelet transform, where Y(2n) is indicates a low-frequency subband and Y(2n+1) a high-frequency subband. Further, floor $\{X\}$ in the above equations represents the largest integral value that does not exceed X. FIG. 13 illustrates this discrete wavelet transform represented schematically.

Figure 3A:
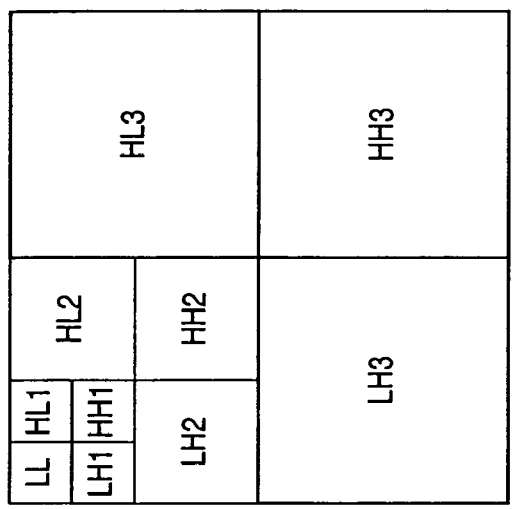
FIGS. 3A to 3C are diagrams useful in describing a two-dimensional discrete wavelet transform.
Figure 3B:
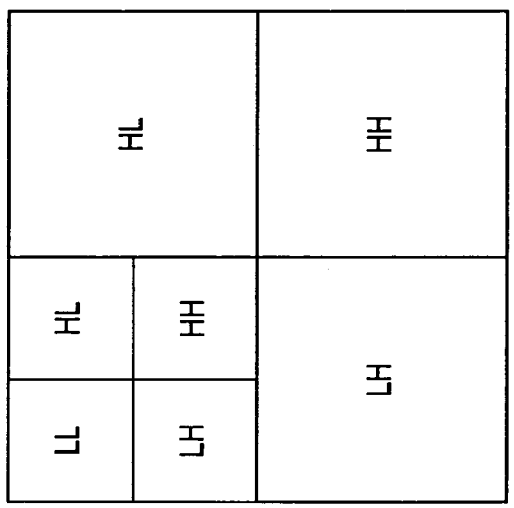
Figure 3C:
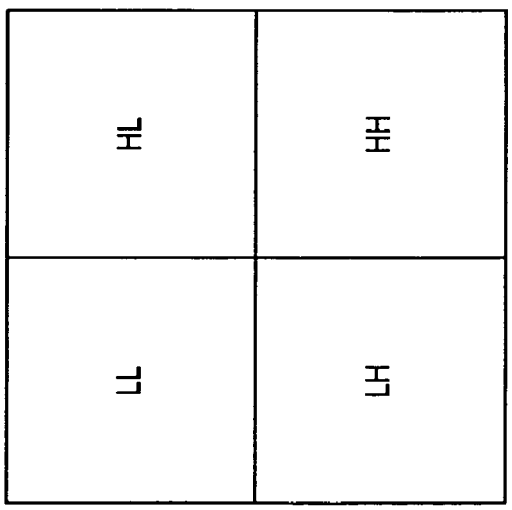

The transform equations deal with one-dimensional data. However, by performing a two-dimensional transform by applying the above transform in order in the horizontal and vertical directions, it is possible to achieve division into four subbands, namely LL, HL, LH, HH shown in FIG. 3A, where L represents a low-frequency subband and H a high-frequency subband. Next, the LL subband is similarly divided into four subbands (FIG. 3B), and the LL subband in these four subbands is further divided into four subbands (FIG. 3C). A total of ten subbands are generated by this operation. The ten subbands shall be called HH1, HL1, . . . , as shown in FIG. 3C. Here the numerals in the names of the subbands indicate the levels of the respective subbands. More specifically, the subbands of level 1 are HL1, HH1, LH1, and the subbands of level 2 are HL2, HH2, LH2. The LL subband is a level-0 subband. Since there is only one LL subband, no number is assigned to it. Further, a decoded image obtained by decoding the subbands of level 0 to level n shall be referred to as a "level-n decoded image".

Levels of resolution of images obtained by decoding are defined as follows:

image obtained by decoding only LL: decoded image of level-0 resolution;

image obtained by decoding LL, LH3, HL3, HH3: decoded image of level-1 resolution;

image obtained by decoding LL to HH2: decoded image of level-2 resolution; and image obtained by decoding LL to HH3: decoded image of level-3 resolution.

The higher the level, the higher the resolution of the decoded image.

The transform coefficients of the ten subbands are stored temporarily in a buffer 104, and the coefficients are output to a coefficient quantizing unit 105 in the order LL, HL1, LH1, HH1, HL2, LH2, HH2, HL3, LH3, HH3, namely in order from subbands of low level to subbands of high level.

In this embodiment, it is assumed that the discrete wavelet transform is applied to a still picture frame three times and to a moving picture frame one time.

The coefficient quantizing unit 105 quantizes the coefficients of each subband output from the buffer 104 at quantization steps determined on a per-frequency-component basis and outputs the quantized values (coefficient quantization values) to an entropy encoder 106 (step S504). If we let X represent a coefficient value and let q represent the value of a quantization step with regard to a frequency component to which the coefficient belongs, then the quantized coefficient value Q(X) will be obtained by the following equation:

$$Q(X)=\text{floor}\{[X/q]+0.5\}$$

FIG. 4 illustrates the correspondence between frequency components and quantization steps in this embodiment. Large quantization steps are applied to subbands of higher levels in the manner illustrated. It is assumed that the quantization steps of each of the subbands shown in FIG. 4 have been stored in a memory (not shown) such as RAM or ROM. After all transform coefficients in one subband are quantized, the coefficient quantization values are output to the entropy encoder 106.

Figure 5:
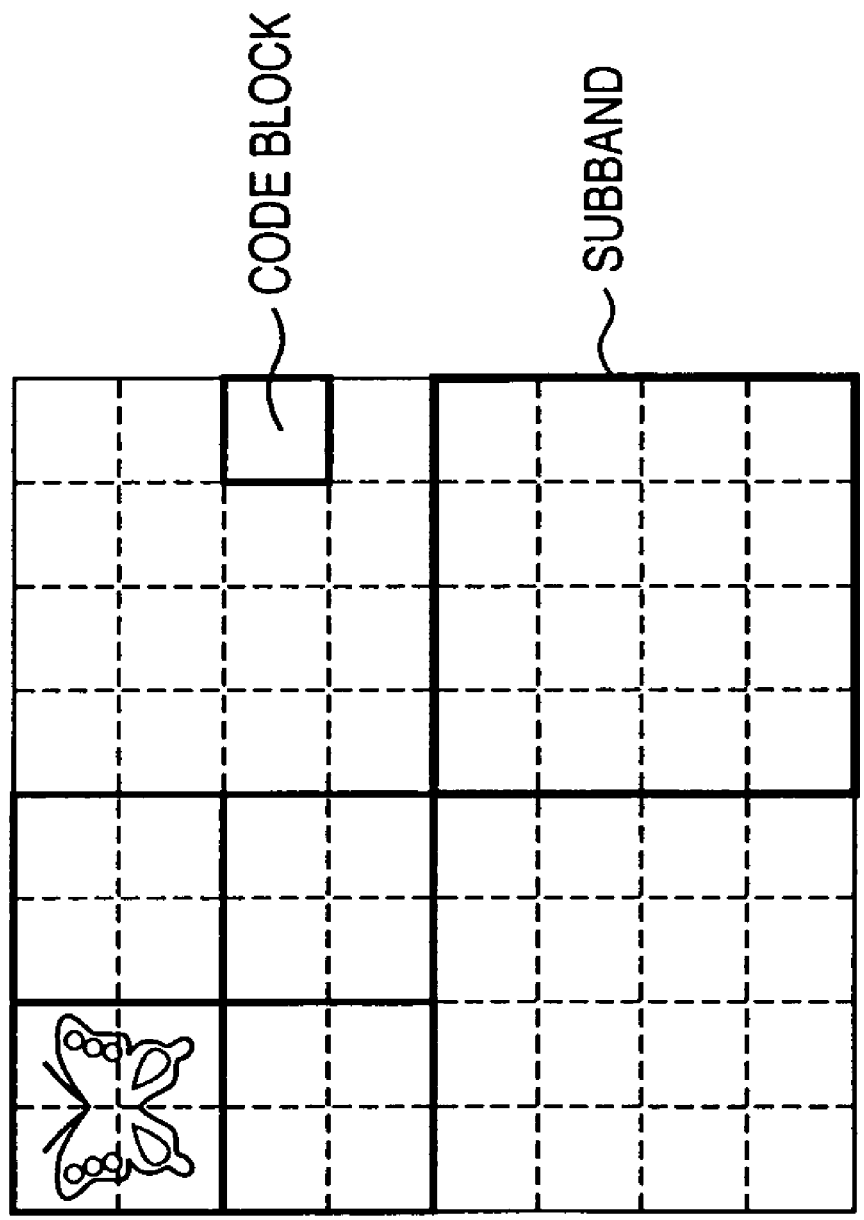
FIG. 5 is a diagram useful in describing division into code blocks.
Figure 6:
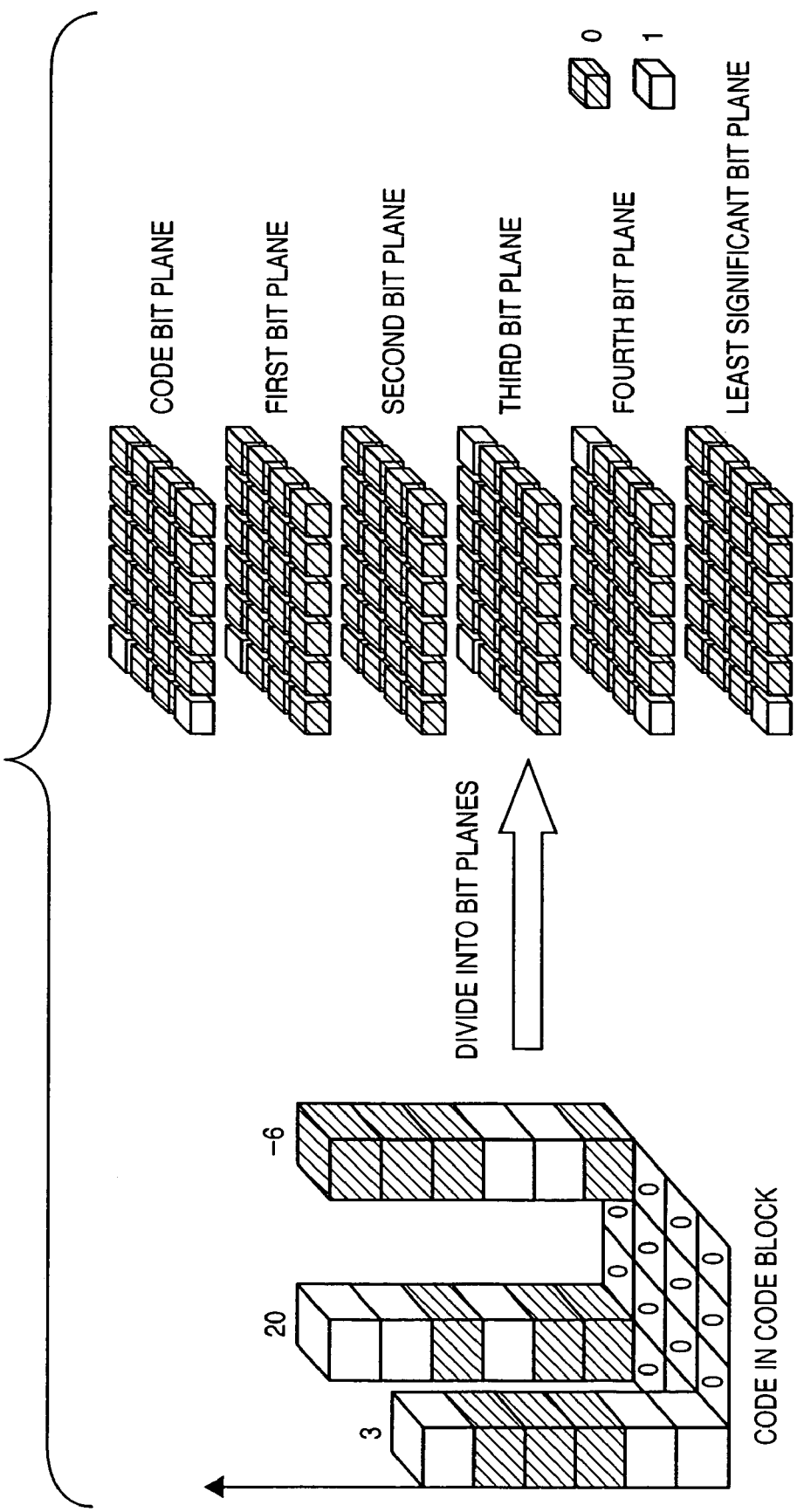
FIG. 6 is a diagram useful in describing division into bit planes.
Figure 7:
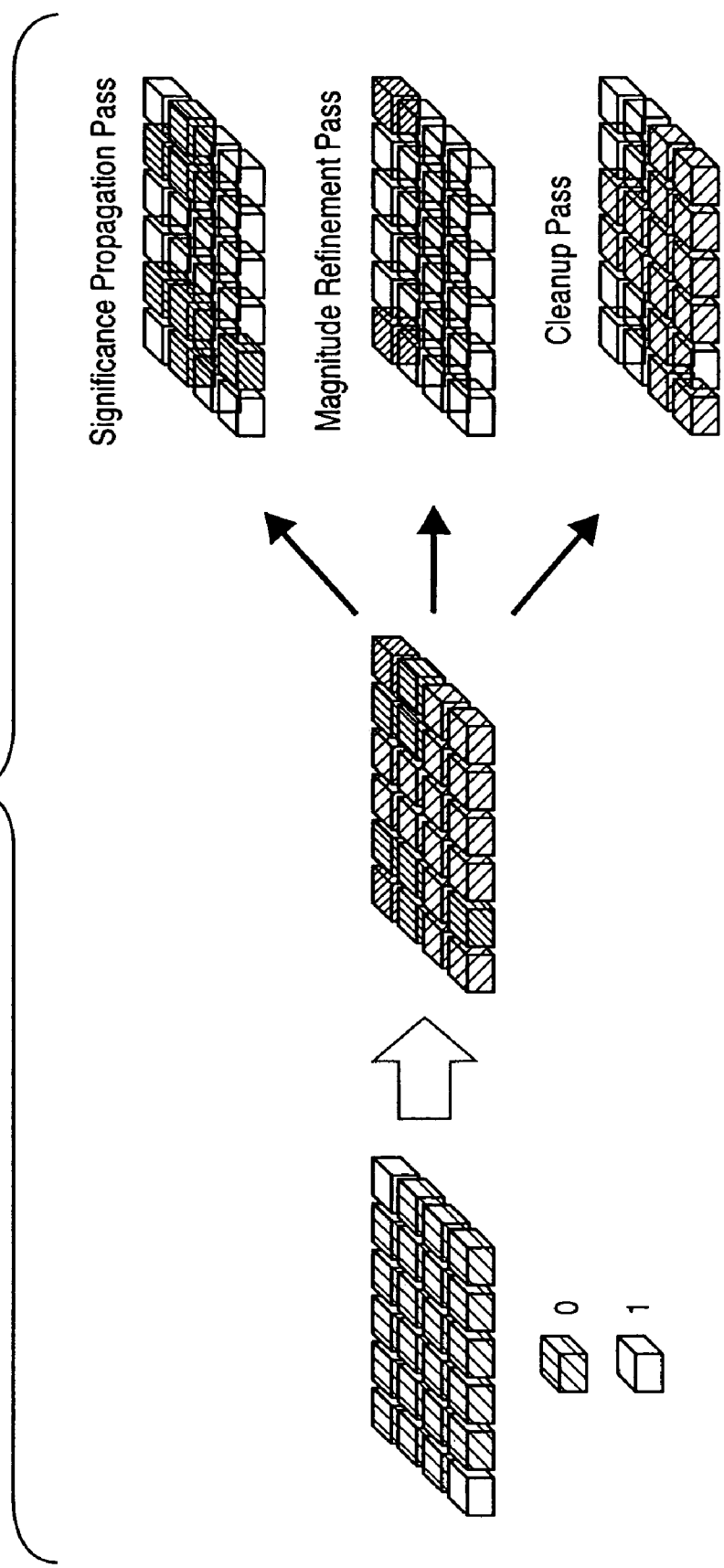
FIG. 7 is a diagram useful in describing coding passes.

The entropy encoder 106 subjects an entered coefficient quantization value to entropy encoding (step S505). First, as shown in FIG. 5, each subband, which is a set of entered coefficient quantization values, is divided into squares (referred to as "code blocks"). Each code block is set to a size of 2 m×2n (where m, n are integers of 2 or greater), etc. Each code block is further divided into bit planes, as depicted in FIG. 6. Moreover, as shown in FIG. 7, each bit in a certain bit plane is classified into three types based upon a certain classification rule, whereby three types of coding passes, each of which is a set of bits of the same type, are generated. The entered coefficient quantization values undergo binary arithmetic encoding, which is entropy encoding, in units of the coding passes obtained, whereby entropy-encoded values are generated.

The specific processing sequence of entropy encoding is as follows: In regard to one code block, encoding is performed in order from higher-order to lower-order bit planes. In regard to a bit plane of this one code block, the three types of passes shown in FIG. 7 are encoded in order from top down.

The entropy-encoded coding passes are output to a tile encoded data generator 107.

The tile encoded data generator 107 generates, from a plurality of entered coding passes, tile encoded data composed of one or a plurality of layers, in which these layers serve as the unit of data (step S506). A description relating to layer composition will be rendered below.

Figure 8:
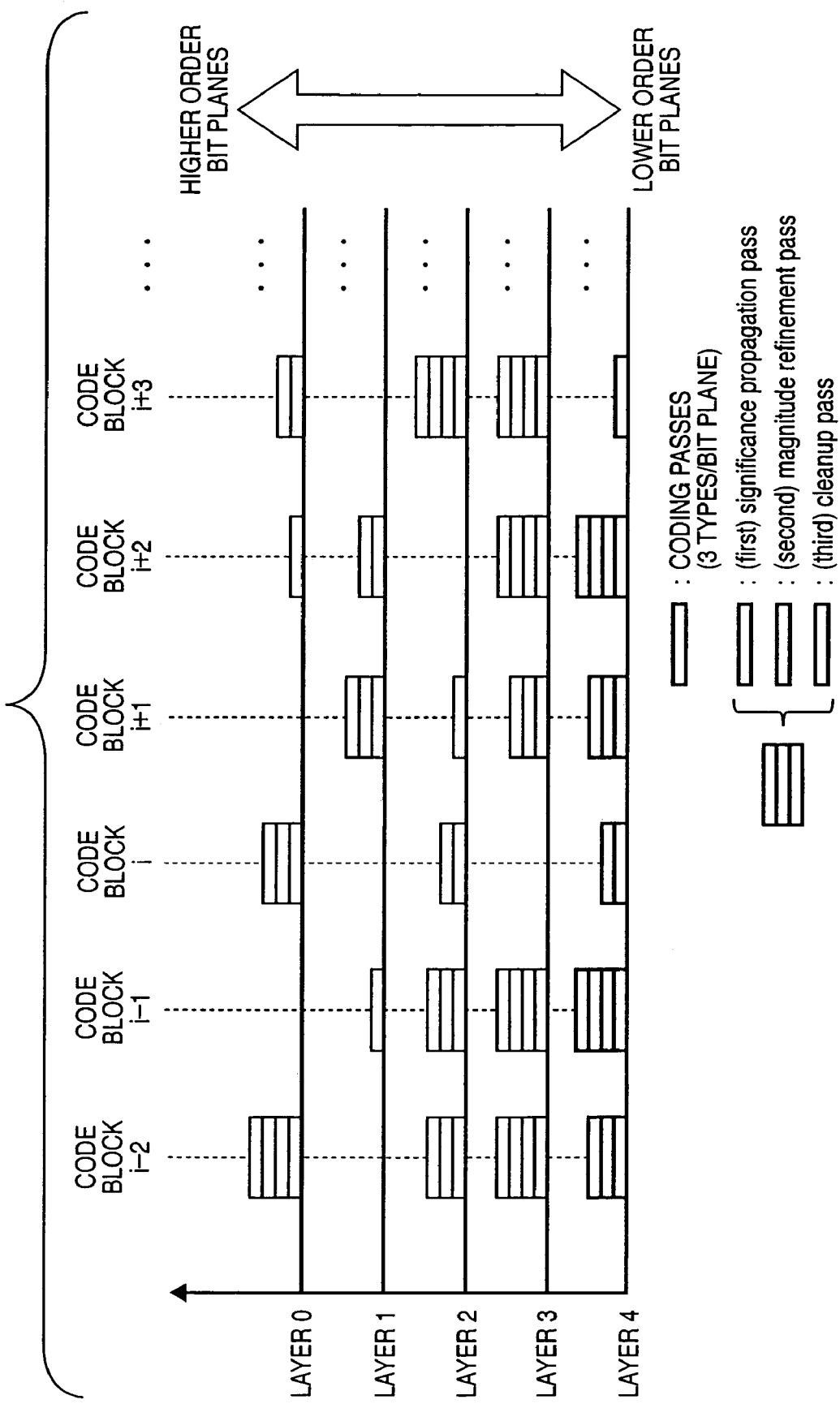
FIG. 8 is a diagram useful in describing generation of layers.
Figure 9:
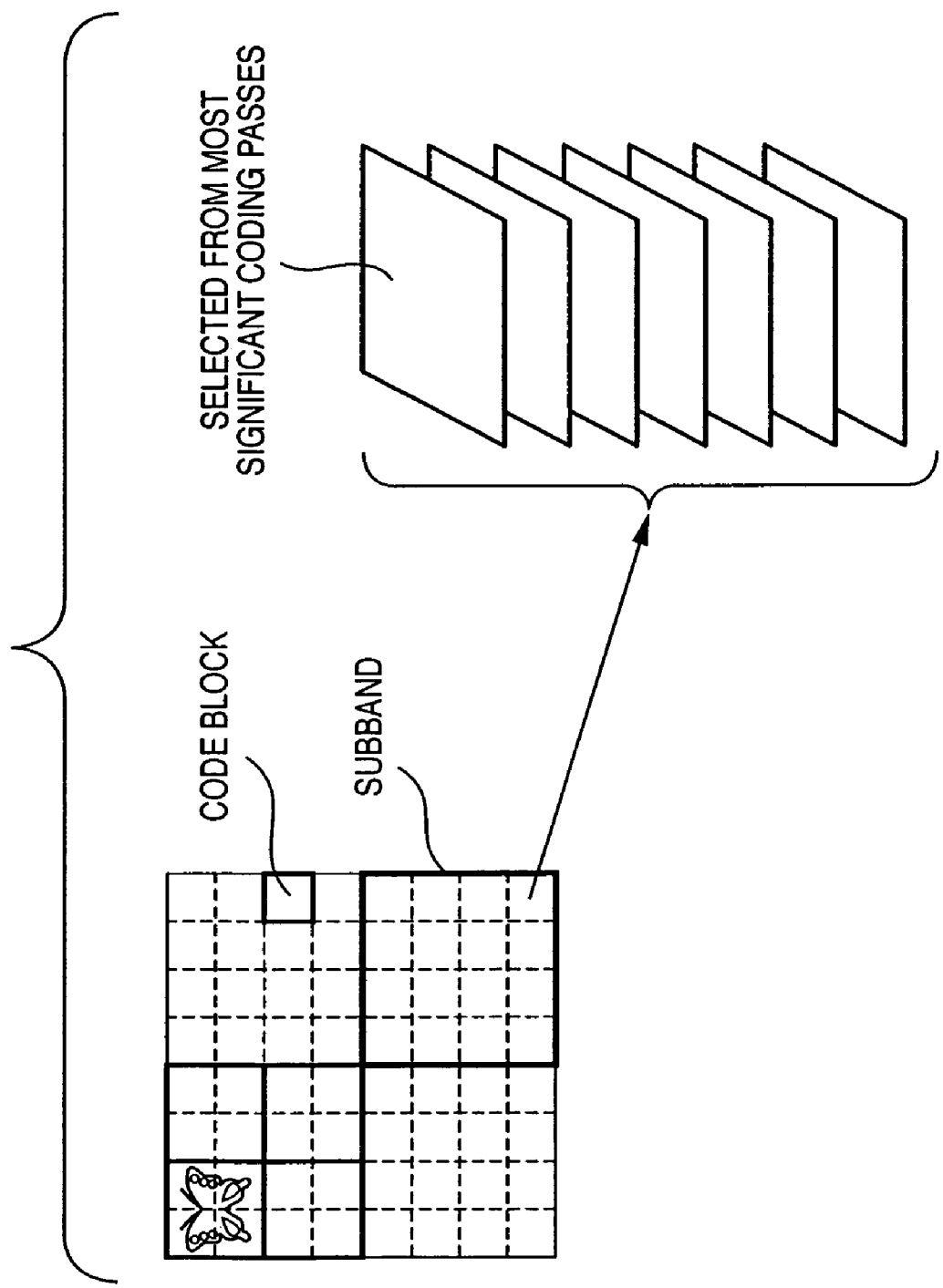
FIG. 9 is a diagram useful in describing generation of layers.
Figure 10:
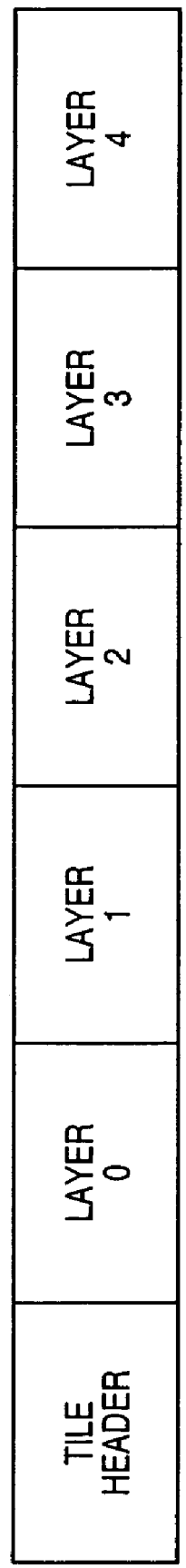
FIG. 10 is a diagram useful in describing the structure of tile encoded data.

As shown in FIG. 8, this processing section constructs layers upon collecting entropy-encoded coding passes from a plurality of code blocks in a plurality of subbands. FIG. 8 illustrates a case where five layers have been generated. It should be noted that when coding passes are acquired from a certain code block, as shown in FIG. 9, a coding pass present in the highest order is selected in this code block at all times.

The tile encoded data generator 107 thenceforth arranges the generated layers in order starting from the layer situated at the highest ranking position and attaches a tile header to the beginning of the layers, thereby generating tile encoded data. Information for identifying a tile, code length of the tile encoded data and various parameters used in compression are stored in the header. The tile encoded data thus generated is output to frame encoded data generator 108.

In the generation of tile encoded data in a still picture frame according to this embodiment, tile encoded data obtained from a subband group that constructs moving picture part data and tile encoded data obtained from a subband group that constructs difference data is generated.

Control returns to step S503 if tile data to be encoded remains and proceeds to step S508 if tile data to be encoded does not remain (step S507).

Figure 11:
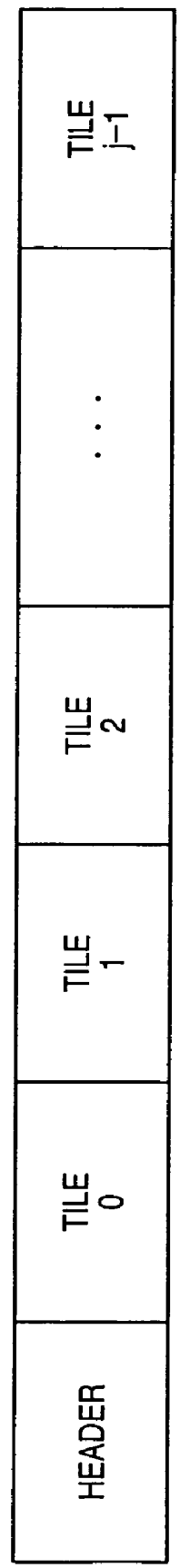
FIG. 11 is a diagram useful in describing the structure of frame encoded data.

As shown in FIG. 11, the frame encoded data generator 108 arranges the tile encoded data in a prescribed order and attaches a header to the leading end to thereby generate frame encoded data (step S508). The horizontal and vertical sizes of the input image or tile, parameters used in compression and the code length of the frame encoded data are stored in the header. The frame encoded data thus generated is output from a frame encoded data output unit 109 to the recording unit 1803.

According to this embodiment, moving picture frame encoded data and moving picture part encoded data is collected and output as moving picture encoded data. Further, difference encoded data is output in a form distinguished from the moving picture encoded data.

The foregoing is a method of encoding frame data by the JPEG-2000 encoder 1802 according to this embodiment.

<2. Decoding and Playback Method>

Next, a method of decoding moving picture encoded data created at set forth above will be described.

Figure 19:
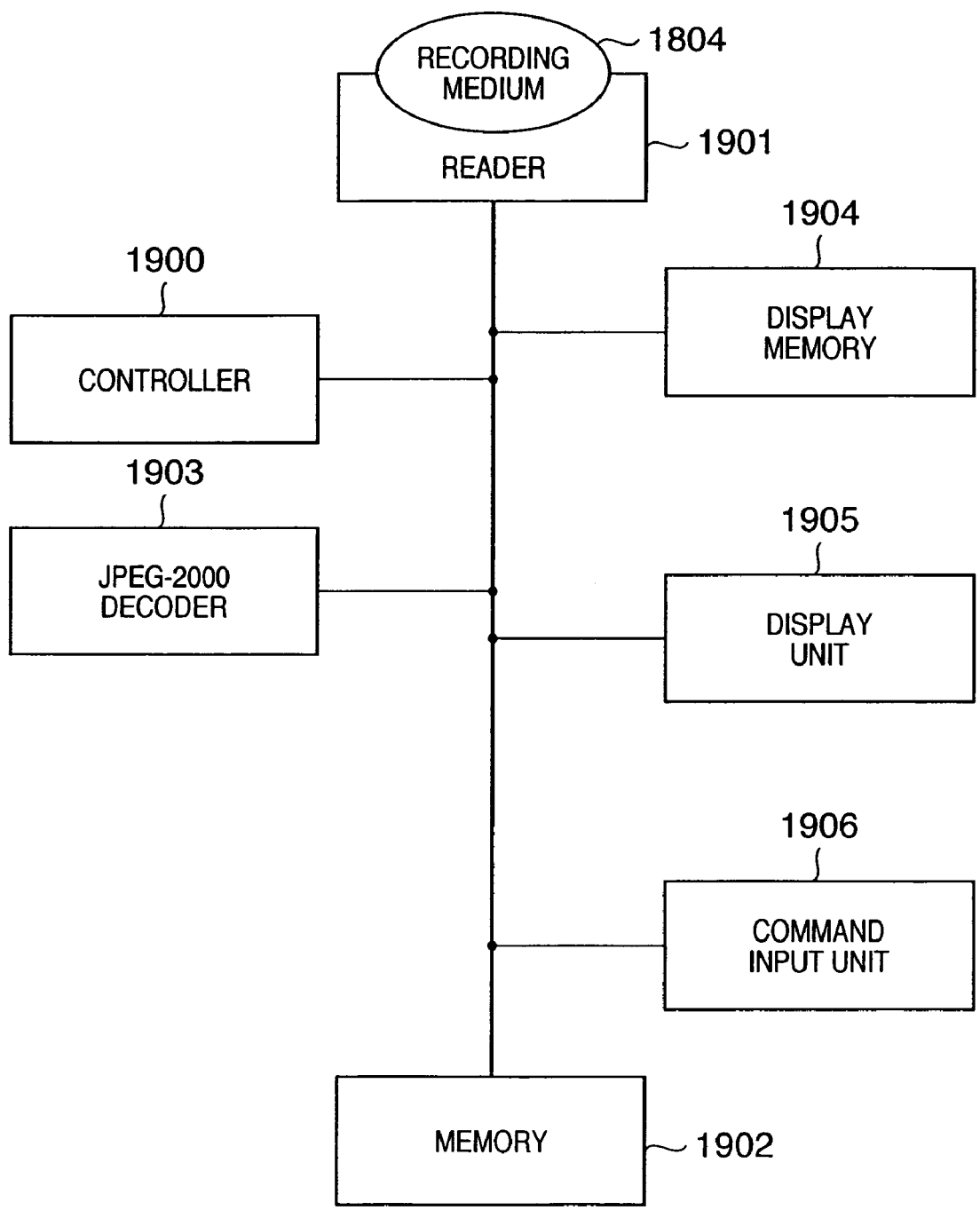
FIG. 19 is a block diagram illustrating an example of the structure of a decoding apparatus capable of being utilized by the digital camera according to the first embodiment.

FIG. 19 is a block diagram illustrating an example of the structure of a decoding apparatus capable of being utilized by the digital camera according to this embodiment.

The decoding apparatus includes a controller 1900 for controlling the operation of each component of the decoding apparatus. The controller 1900 receives commands (e.g., for changeover between a normal playback mode and a slow playback mode, for starting playback and for stopping playback, etc.) from a user interface, described later, and controls the operation of each component of the apparatus.

A reader 1901 reads out moving picture encoded data that has been recorded on the recording medium 1804 of FIG. 18 described above. The reader 1901 may be the recording unit 1803. A memory 1902 functions to temporarily store moving picture encoded data read by the reader 1901. In addition, the memory 1902 temporarily stores a decoded image obtained by decoding this moving picture encoded data. Further, the memory 1902 is capable of storing program data and the like used by each component of the apparatus and is used also as various working memories.

A JPEG-2000 decoder 1903 corresponds to the decoding side of the JPEG-2000 encoder 1802 described above. The JPEG-2000 decoder 1903 successively decodes moving picture encoded data that has been encoded according to JPEG 2000 and recorded on the recording medium 1804. The decoding method according to the JPEG 2000 scheme will be described later.

A display memory 1904 stores one frame of an image desired to be displayed. In this embodiment, it is assumed that decoded images that have been stored temporarily in the memory 1902 are read out successively (though there also cases where the same frame is read out repeatedly) and written to the display memory 1904 based upon timing control by the controller 1900.

It should be noted that the display memory 1904 has a storage capacity for a plurality of frames in order that writing and reading will not overlap, and that the controller 1900 manages writing and reading of the memory.

A display unit 1905 corresponds to the display monitor of a personal computer or the like. The display unit 1905 displays frames (images), which are held in the memory 1904, at the display frame rate of the display unit.

A command input unit 1906 is a key or button provided on, e.g., a mouse, keyboard or camera control panel. Alternatively, the command input unit 1906 may be a touch-sensitive panel integrated with the display unit 1905. While referring to a control screen displayed on the display unit, the user is capable of entering any playback-related command via the command input unit 1906.

Figure 20:
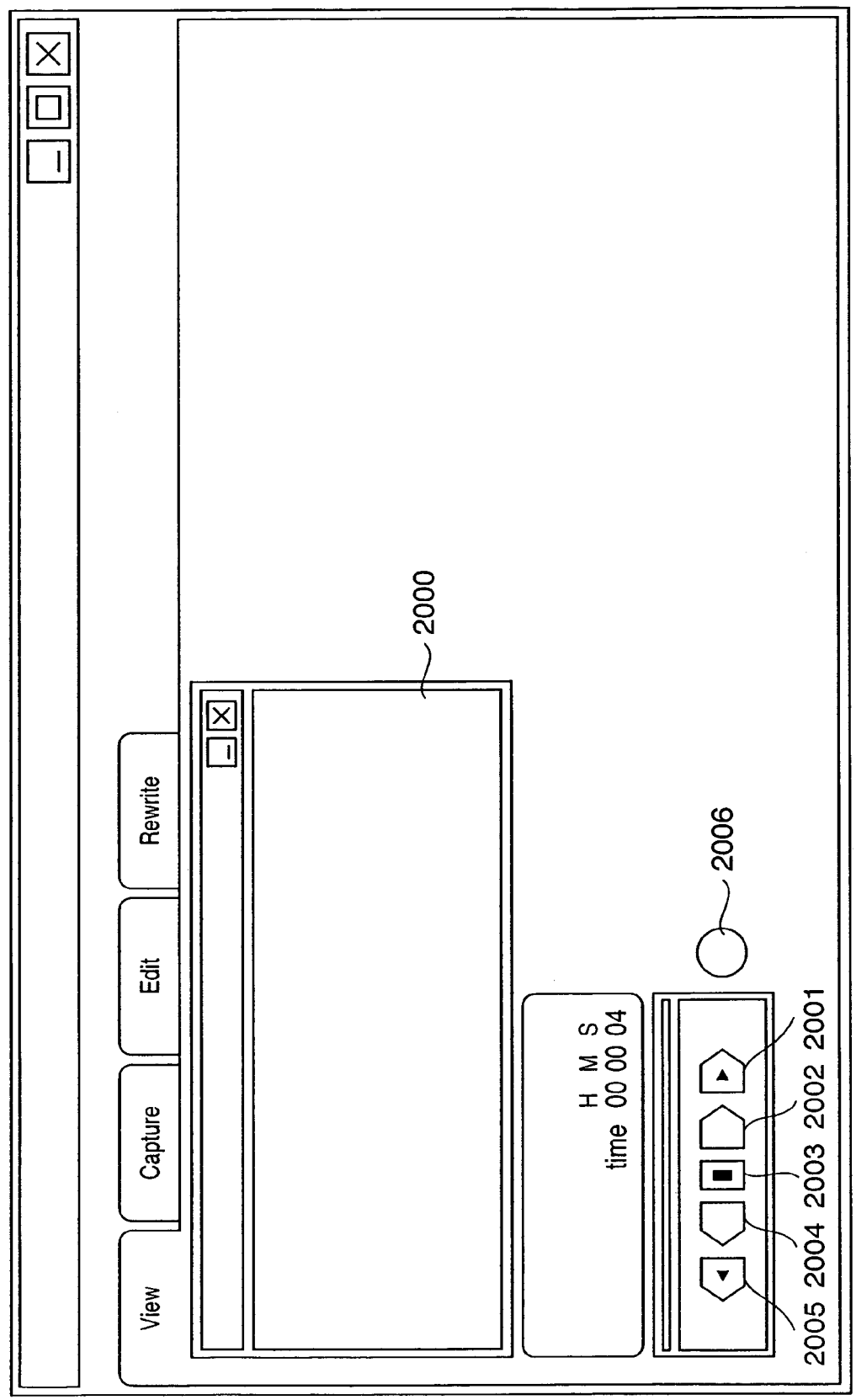
FIG. 20 is a diagram useful in describing an image display viewer presented by the decoding apparatus of FIG. 19.

FIG. 20 is a diagram showing an example of a control screen displayed on the display unit 1905. A display area 2000 is for actually displaying an image that has been stored in the display memory 1904. In this embodiment, the image is displayed in the area 2000 rather than on the entire screen of the display unit 1905.

Buttons 2001 and 2002 are for commanding playback (normal playback) along the normal time-axis direction (the direction in which time advances). The button 2001 commands playback at normal speed and the button 2002 playback and slow speed. A stop button 2003 also is provided. (A temporary-stop button also is provided, though this is not shown.)

Buttons 2004 and 2005 are for commanding playback (reverse playback) along the direction opposite the normal time-axis direction. The button 2005 commands reverse playback at normal speed and the button 2002 reverse playback and slow speed. In this embodiment, each frame constituting a moving picture is encoded independently and therefore reverse playback can be achieved easily by decoding and displaying each of the frames in the reverse direction.

A type button 2006 is for deciding the type of image (moving picture or still picture) that will be displayed when a button designating playback is pressed. For example, if a button designating playback is pressed in a state in which the type button 2006 has been pressed, a still picture will be displayed. If playback is designated in a state in which the type button 2006 has not been pressed, then a moving picture will be displayed.

Next, the flow of operation up to the actual decoding and displaying of moving picture encoded data will be described in detail with reference to the flowchart of FIG. 21. Here only control of operation relating to normal playback and display of still picture frames will be described. With regard to slow playback (which corresponds to use of the button 2002), it will suffice to perform decoding and playback while skipping frames. With regard to reverse playback (which corresponds to use of buttons 2004 and 2005), it will suffice to think of the time axis of normal playback (normal playback and slow playback) in reverse, and since this processing can readily be understood by interchanging button 2005 for button 2001 and button 2004 for button 2002 in the description that follows, it need not be described here.

Figure 21:
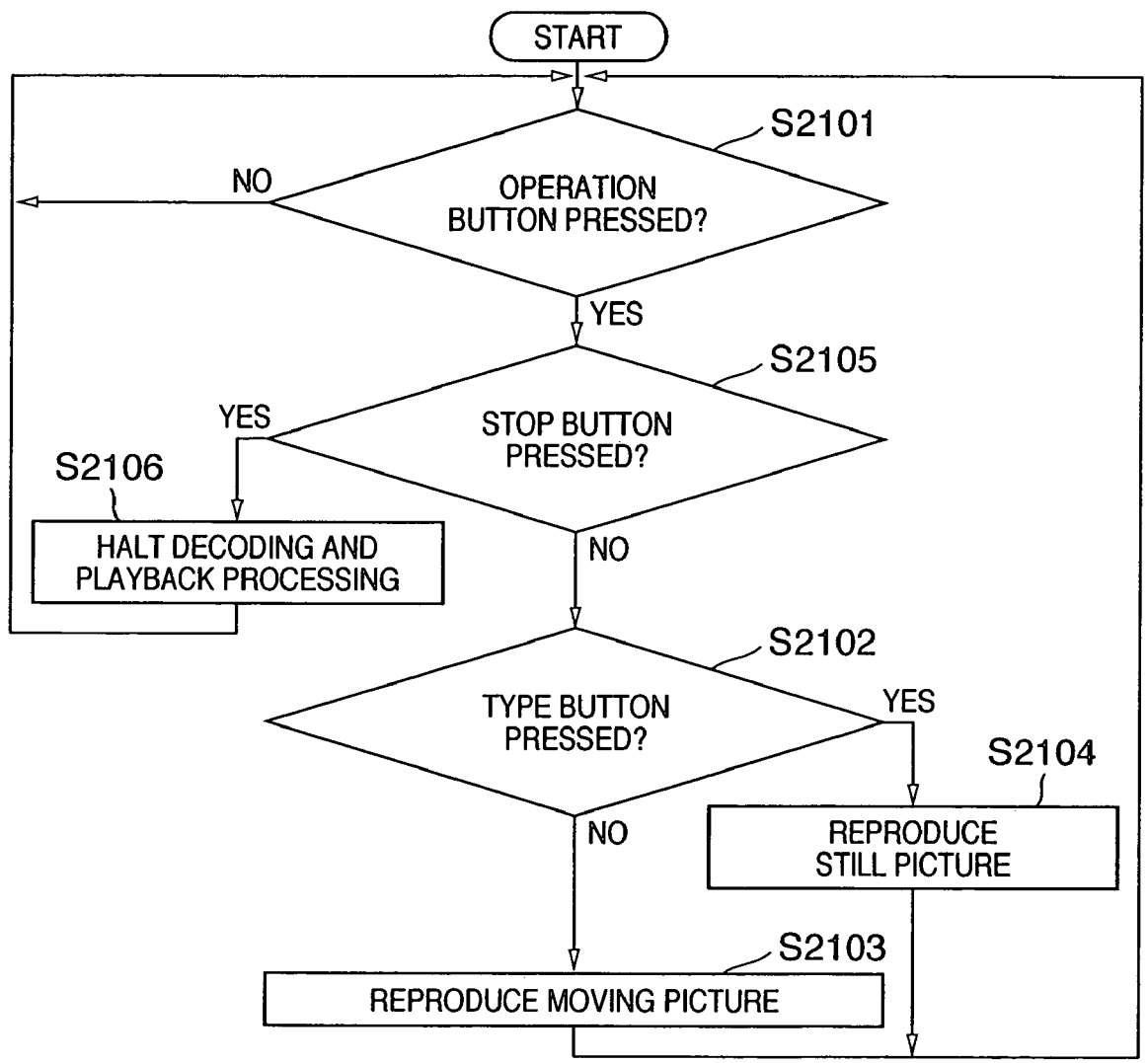
FIG. 21 is a flowchart for describing the operation of the image display viewer according to the first embodiment of the present invention.

In FIG. 21, it is determined at step S2101 whether either playback button 2001 or stop button 2003 has been pressed by the user. It should be noted that the operation "press" here is performed at the command input unit 1906 (keys or touch-sensitive panel) shown in FIG. 19.

When button 2001 or 2003 has been pressed, it is determined whether this is followed by pressing of some other button. It should be noted that the order of these determinations is not particularly limited. If button 2003 has been pressed ("YES" at step S2105), all decoding and playback operations are halted (step S2106). If button 2001 has been pressed ("NO" at step S2105), it is determined at step S2102 whether the type button 2006 has been pressed. If the type button 2006 has been pressed, then a still picture frame is displayed at step S2104. The method of achieving this will be described later. If the type button 2006 has not been pressed, on the other hand, then a moving picture frame is decoded and a moving picture is reproduced at step S2103. The method of achieving this will be described later.

The above control is exercised by the controller 1900 based upon a command input from a user applied via the command input unit 1906.

<Moving Picture Playback Method>

The moving picture playback method of step S2104 in FIG. 21 will now be described.

In accordance with a command from the user, the controller 1900 uses the reader 1901 to read out data necessary for decoding from among the moving picture encoded data that has been recorded on the recording medium 1804 in the format shown in FIG. 22, and inputs this data to the JPEG-2000 decoder 1903. The moving picture encoded data that has been input to the JPEG-2000 decoder 1903 is subjected to JPEG-2000-compliant decoding processing frame by frame and is written to the display memory 1904 and displayed by the display unit 1905 in the manner described above. The decoding method compliant with JPEG 2000 will be described later.

<Method of Displaying Still Picture Frames>

Figure 23:
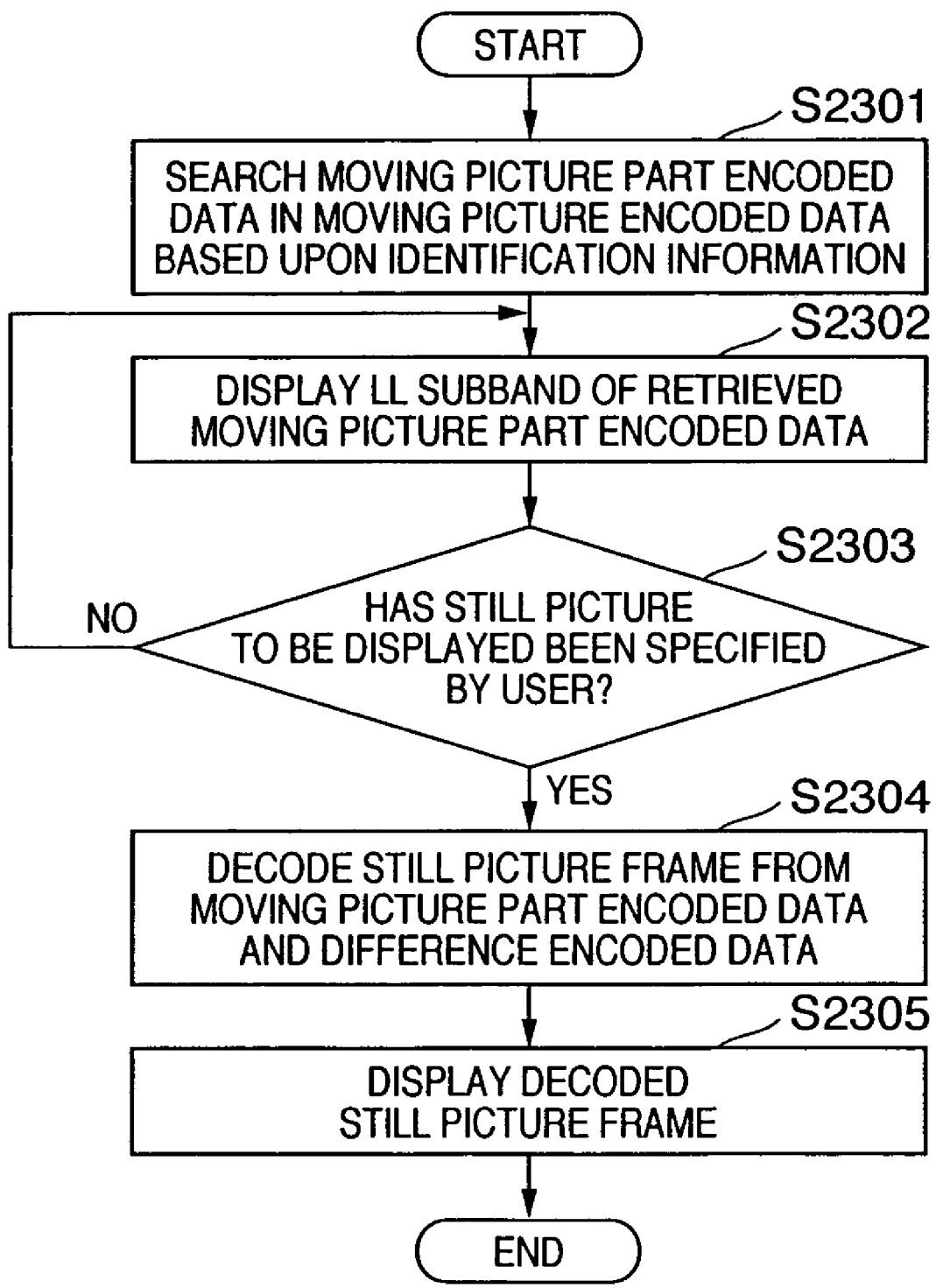
FIG. 23 is a flowchart for describing decoding processing by the image processing apparatus according to the first embodiment of the present invention.
Figure 24:
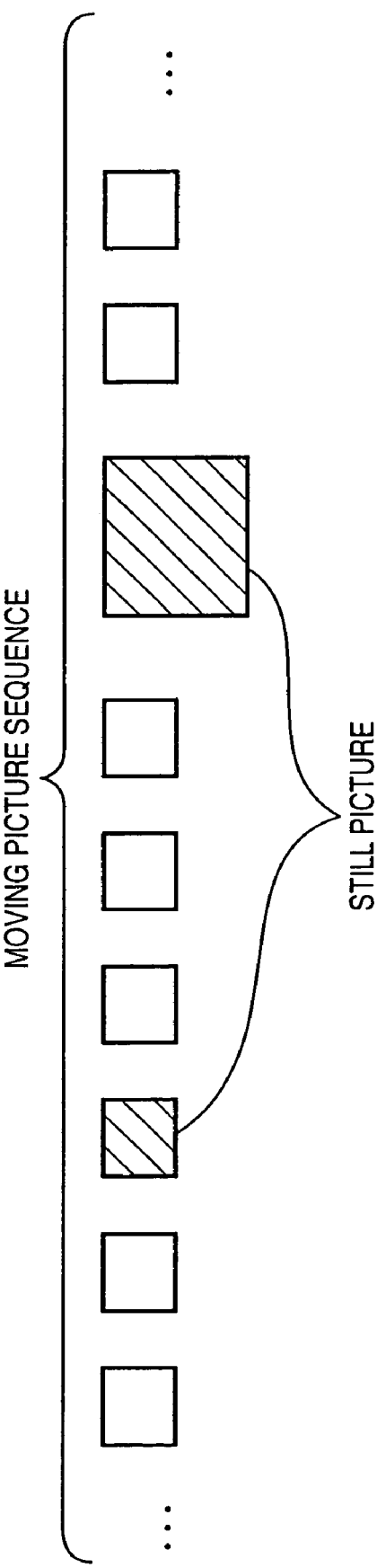
FIG. 24 is a diagram schematically illustrating the structure of moving picture data dealt with by the image processing apparatus according to the present invention.

The method of displaying still picture frames at step S2103 in FIG. 21 will be described with reference to the flowchart of FIG. 23.

By utilizing identification information, which identifies still picture frames, that has been stored in the recording medium 1804 shown in FIG. 22, the controller 1900 searches for a still picture frame in the moving picture encoded data (step S2301). Next, the controller 1900 decodes moving picture part data of the retrieved still picture frame and displays the LL subband of the moving picture part data on the display unit 1905 (step S2302).

If the user specifies a still picture frame to be displayed at step S2303 by operating the command input unit 1906 (mouse, etc.) shown in FIG. 19, the still picture is decoded and displayed based upon the still picture frame (the moving picture part data thereof) whose decoding has been completed and the difference encoded data corresponding to this still picture frame (steps S2304, 2305). The method of decoding and displaying the still picture would be obvious to those skilled in the art and this processing need not be described here.

<Overview of JPEG-2000-Compliant Decoding Method>

Figure 14:
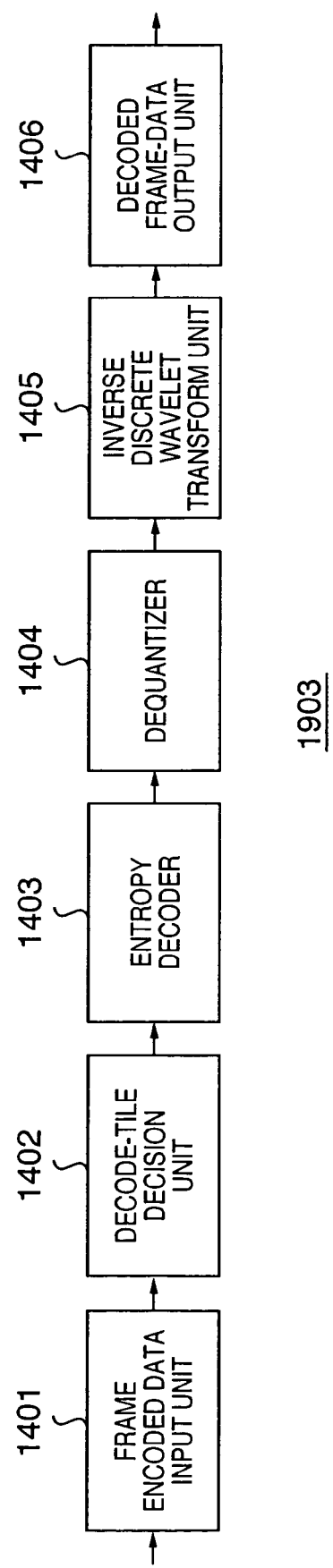
FIG. 14 is a block diagram illustrating an example of the functional structure of a JPEG-2000-compliant decoder according to the first embodiment of the present invention.
Figure 16:
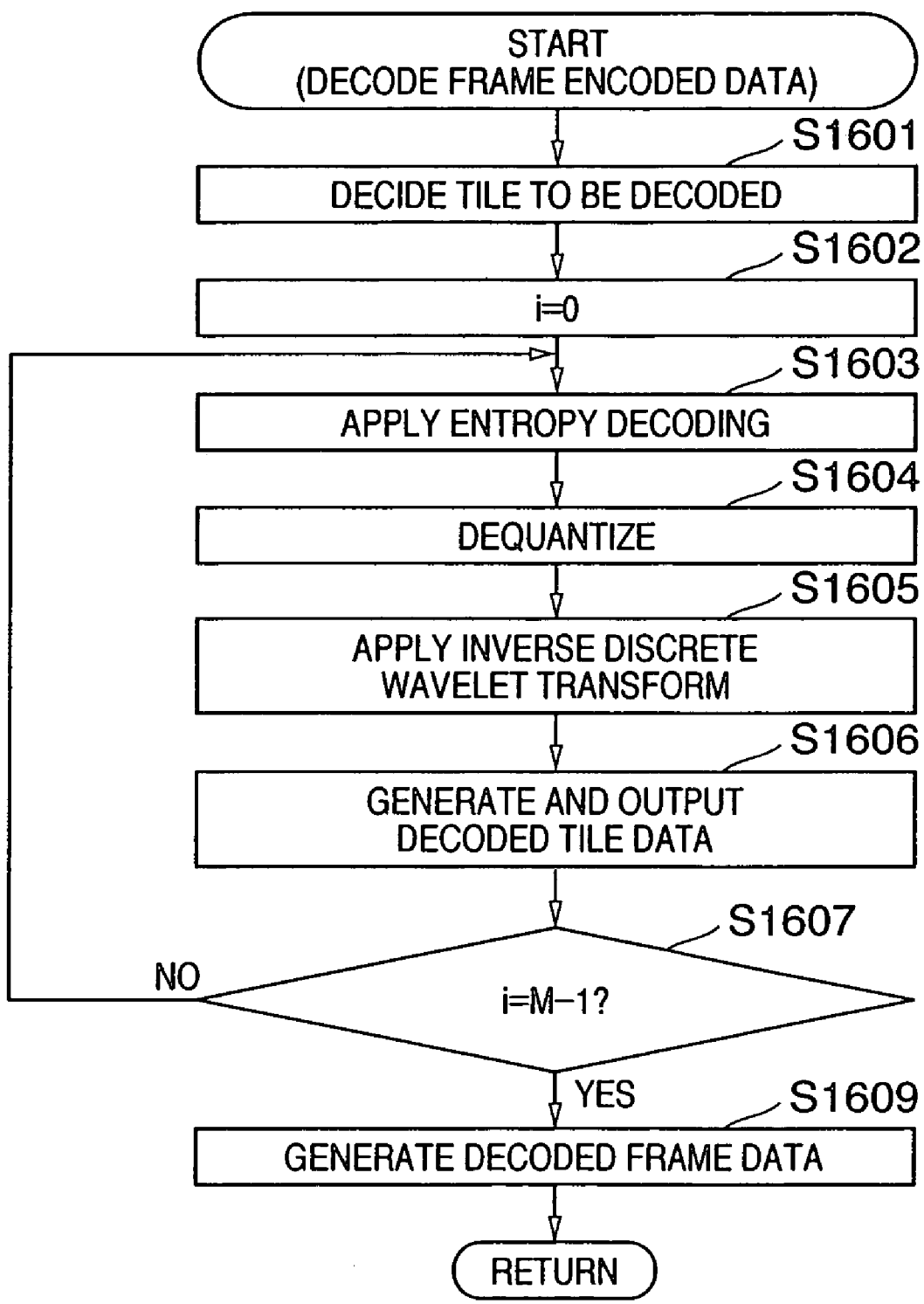
FIG. 16 is a flowchart for describing decoding processing executed by the JPEG-2000-compliant decoder according to the first embodiment of the present invention.

Next, decoding processing by the JPEG-2000 decoder 1903 will be described with reference to FIG. 14, which is a block diagram showing an example of the structure of the JPEG-2000 decoder 1903, and the flowchart of FIG. 16, which is for describing decoding processing.

Figure 15:
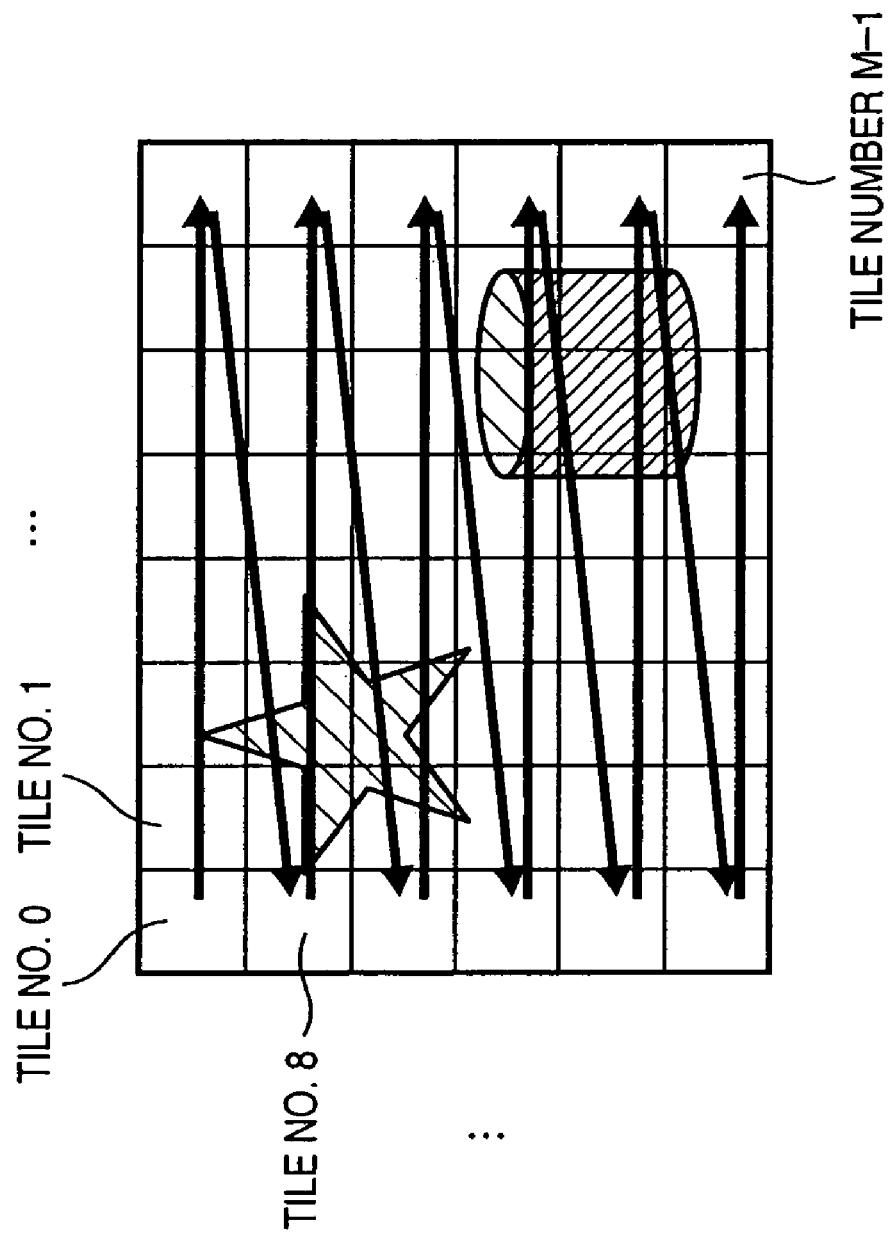
FIG. 15 is a diagram useful in describing the sequence of tile decoding.

Frame encoded data and information concerning the playback method that have been input to a frame encoded data input unit 1401 are output to a decode-tile decision unit 1402. The latter decides tiles, which are to be decoded, sequentially from left to right starting from the tile at the upper left and then moving down row by row, as shown in FIG. 15.

After a tile to be decoded has been decided, a counter (not shown) for recognizing the tile being processed by the JPEG-2000 decoder 1903 is set to i=0 (step S1602). It should be noted that this step is skipped when i>0 holds.

Next, the tile encoded data to be decoded is input to an entropy decoder 1403, which applies entropy decoding to reconstruct the quantization values (step S1603). The reconstructed quantization values are output to a dequantizer 1404. The dequantizer 1404 dequantizes the quantization values that have been input thereto, thereby reconstructing the coefficients of the discrete wavelet transform. These coefficients are output to an inverse discrete wavelet transform unit 1405 (step S1604). Inverse quantization is performed according to the following equation:

$$Xr = Q \times q$$

where Q represents a quantization value, q a quantization step and Xr a reconstructed coefficient of a discrete wavelet transform.

The inverse discrete wavelet transform unit 1405 implements a discrete wavelet transform based upon the following equations:

$$X(2n) = Y(2n) - \text{floor}\{[Y(2n-1) + Y(2n+1) + 2]/4\}$$

$$X(2n+1) = Y(2n+1) + \text{floor}\{[X(2n) + X(2n+2)]/2\}$$

Here Y(2n) represents the coefficient of a discrete wavelet transform of a low-frequency subband, and Y(2n+1) represents the coefficient of a discrete wavelet transform of a high-frequency subband. Further, x(n) represents decoded data. The transform equations deal with one-dimensional data. However, a two-dimensional transform is implemented by applying the above transform in order in the horizontal and vertical directions. Decoded tile data is generated and output to a decoded frame-data output unit 1406 (step S1606).

Control returns to step S1603 if a tile to be decoded remains and control proceeds to step S1608 if a tile to be decoded does not remain (step S1607). The decoded frame-data output unit 1406 generates and outputs the decoded frame data upon arranging the decoded tile data in the order i=0, . . . , M−1 (step S1608).

The foregoing is a description of a method of decoding frame data by JPEG 2000 in this embodiment.

Thus, a digital camera having a special still picture taking capability according to this embodiment shares data between still and moving pictures, thereby making it possible to reduce storage-medium capacity needed to record moving pictures.

Second Embodiment

According to the first embodiment, a method of achieving a reduction in required storage capacity is illustrated in a case where the number of pixels of a still picture differs from that of a moving picture.

This embodiment is characterized in that the required storage capacity is reduced in a case where the numbers of pixels are the same for still and moving pictures and recording of data is performed upon making the accuracy of pixels (the S/N ratio) of a still picture different from that of a moving picture.

Processing in this embodiment that is essentially different from that of the first embodiment is only the processing executed by the JPEG-2000-compliant encoding processor. Accordingly, in the description that follows, emphasis will be placed on JPEG-2000 encoding processing specific to this embodiment; other processing need not be described.

(Description of JPEG-2000 Encoding Method)

In the first embodiment, the moving picture part data is a low-frequency component (low-level subband) and the difference data is a high-frequency component (high-level subband) in the still picture frame data. In this embodiment, a high-order bit plane is moving picture part data and a low-order bit plane is difference data in the still picture frame. Further, the moving picture part data is constructed in such a manner that a reproduced image obtained from the moving picture part data will have an image quality equivalent to that of a moving picture frame.

In the description that follows, one lowest-order bit plane of still picture frame data is difference data and bit planes of higher orders are moving picture part data.

Figure 27:
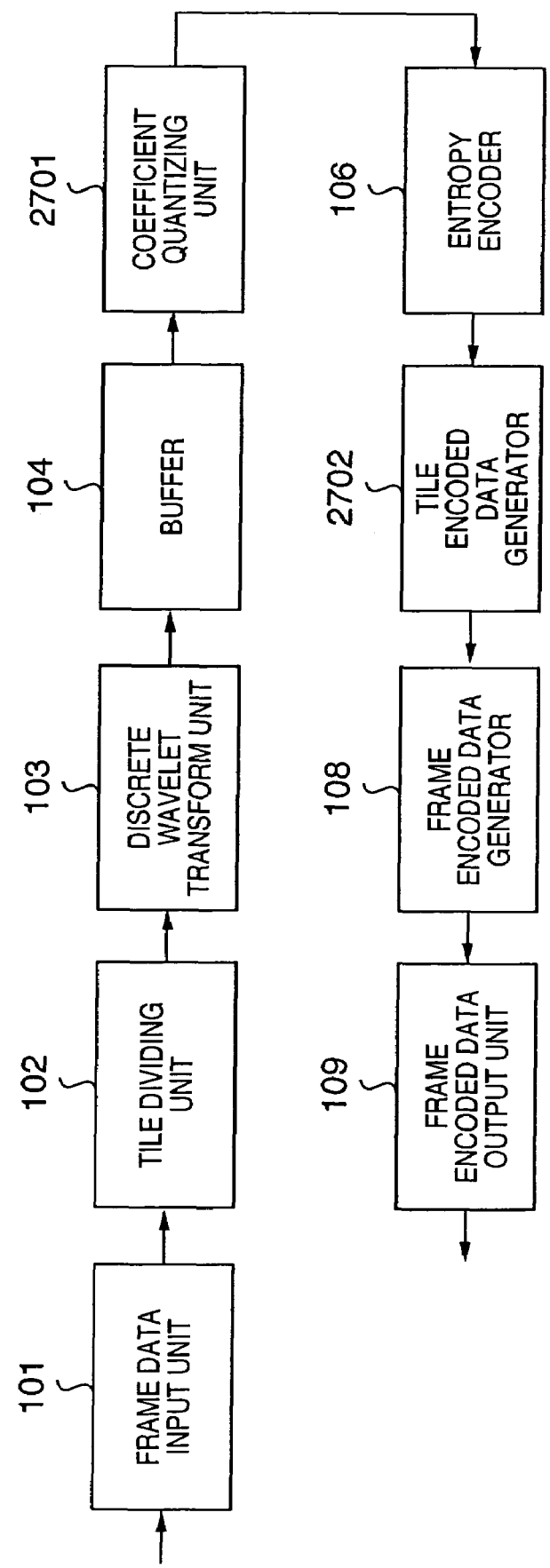
FIG. 27 is a block diagram illustrating an example of the functional structure of a JPEG-2000-compliant encoder according to a second embodiment of the present invention.

FIG. 27 illustrates the structure of a JPEG-2000 encoder according to this embodiment having the above-described composition of a still picture frame. As will be obvious from FIG. 27, the JPEG-2000 encoder according to this embodiment has a coefficient quantizing unit 2701 and a tile encoded data generator 2702 that replace the coefficient quantizing unit 105 and tile encoded data generator 107, respectively, in the JPEG-2000 encoder of the first embodiment.

As illustrated in FIG. 29, coefficients of the discrete wavelet transform input to the coefficient quantizing unit 2701 are quantized at different quantization steps depending upon the attributes of a frame to be encoded. In regard to these two quantization steps, it should be noted that the following holds between a quantization step Qs for a still picture frame and a quantization step Qm for a moving picture frame:

$$Qm_i = 2 * Qs_i$$

where i represents an index that identifies the subband.

The reason for the above is that according to this embodiment, as described above, the difference data is composed of one lowest-order bit plane of still picture frame encoded data, the moving picture part data is composed of bit planes of higher order, and an image quality the same as that of a moving picture frame is sought for the moving picture part data.

The coefficients of the discrete wavelet transform thus encoded are subjected to entropy encoding by the entropy encoder 106 and the encoded data is input to the tile encoded data generator 2702.

The tile encoded data generator 2702 generates tile encoded data from the entropy-encoded moving picture frame data and moving picture part data. Similarly, the entropy-encoded difference data becomes tile encoded data. It should be noted that when a layer structure is adopted with regard to still picture frame data, there is no mixing of difference data and moving picture part data in any layer. The reason for this is that in JPEG-2000 encoding, layers are adopted as the units when data is arrayed in the direction of bit depth to construct the bit stream.

The tile encoded data becomes moving picture encoded data and difference encoded data in the frame encoded data generator 108 and the resultant data is written to the recording medium 1804 via the frame encoded data output unit 109 and recording unit 1803.

Thus, a digital camera having a special still-picture taking capability according to this embodiment shares data in bit plane units between still and moving pictures, thereby making it possible to reduce storage-medium capacity needed to record moving pictures.

Third Embodiment

According to the first embodiment, a method of achieving a reduction in required storage capacity is illustrated in a case where the number of pixels of a still picture differs from that of a moving picture. Further, according to the second embodiment, a method of achieving a reduction in required storage capacity is illustrated in a case where the S/N ratio for a still picture is different from that for a moving picture.

This embodiment is characterized in that the required storage capacity is reduced in a case where the numbers of pixels and the S/N ratios of a still picture are both made different from those of a moving picture.

Processing in this embodiment that is essentially different from that of the first embodiment is only the processing executed by the JPEG-2000-compliant encoding processor. Accordingly, in the description that follows, emphasis will be placed on JPEG-2000 encoding processing specific to this embodiment; other processing need not be described.

(Description of JPEG-2000 Encoding Method)

In this embodiment, image data of 2048×1536 pixels is handled as a still picture frame and image data of 512×384 pixels is handled as a moving picture frame. Further, it is so arranged that the number of bit planes of a subband bearing a resolution the same as that of a moving picture frame in a still picture frame is made one larger than that of the moving picture frame.

Figure 28:
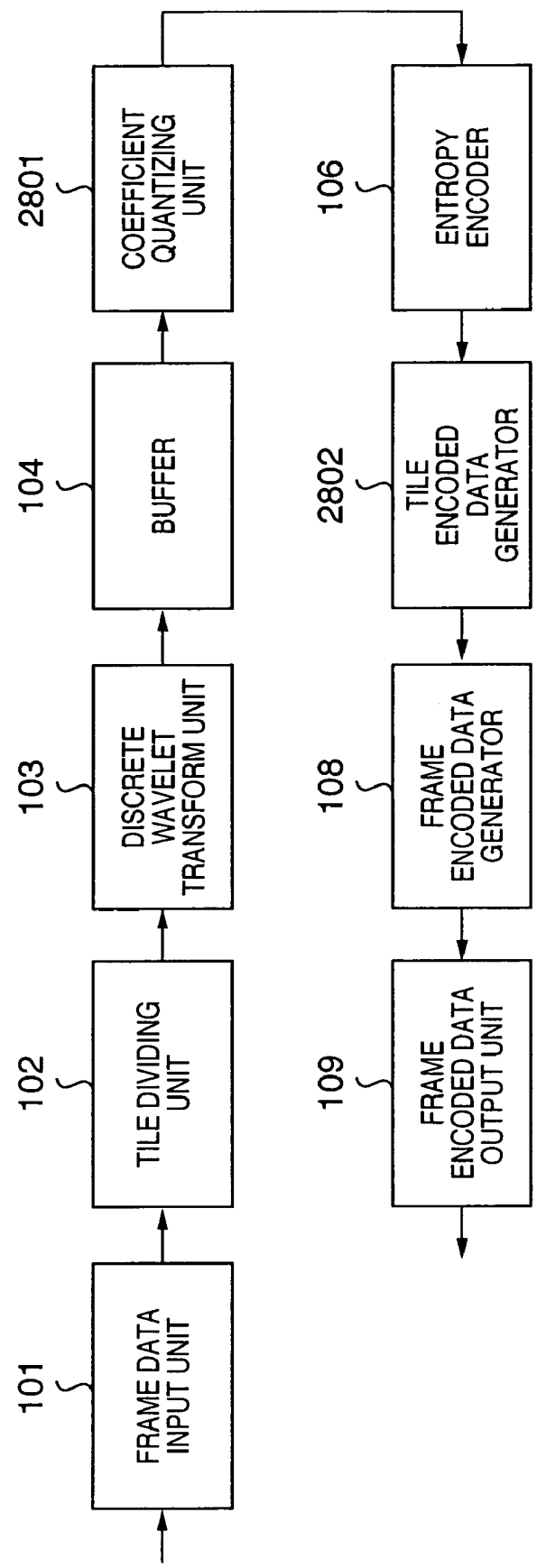
FIG. 28 is a block diagram illustrating an example of the functional structure of a JPEG-2000-compliant encoder according to a third embodiment of the present invention.

FIG. 28 illustrates the structure of a JPEG-2000 encoder according to this embodiment having the above-described composition of a still picture frame. As will be obvious from FIG. 28, the JPEG-2000 encoder according to this embodiment has a coefficient quantizing unit 2801 and a tile encoded data generator 2802 that replace the coefficient quantizing unit 105 and tile encoded data generator 107, respectively, in the JPEG-2000 encoder of the first embodiment.

It is so arranged that when the discrete wavelet transform unit 103 subjects a still picture frame to a wavelet transform, the number of pixels in a single subband will be the same as the number of pixels in a moving picture frame or the number of pixels of a subband group composed of a plurality of subbands will be the same as the number of pixels of a moving picture frame. More specifically, in a case where processing that is a union of a single discrete wavelet transform in the vertical direction and a single discrete wavelet transform in the horizontal direction is made a unified discrete waveform transform, the discrete wavelet transform unit 103 implements the unified discrete waveform transform two or more times with respect to a still picture frame.

Here it is assumed that the discrete wavelet transform unit 103 applies one unified discrete waveform transform to a moving picture frame and applies three unified discrete waveform transforms to a still picture frame.

The coefficient quantizing unit 2801 correlates quantization steps of a single subband or a group of subbands between a moving picture frame and a still picture frame in which the number of pixels is the same as that of the moving picture frame.

More specifically, as illustrated in FIG. 29, the following holds between a quantization step Qs for a still picture frame and a quantization step Qm for a moving picture frame in LL, LH1, HL1, HH1:

$$Qm_i = 2 * Qs_i$$

where i represents an index that identifies the subband.

The coefficients of the discrete wavelet transform thus encoded are subjected to entropy encoding by the entropy encoder 106 and the encoded data is input to the tile encoded data generator 2802.

The tile encoded data generator 2802 generates tile encoded data upon providing a layer structure for a still picture frame and moving picture frame.

Figure 30:
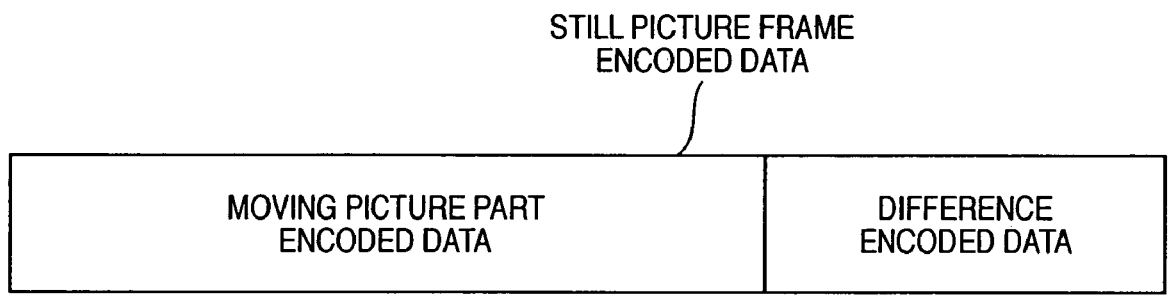
FIG. 30 is a diagram illustrating the structure of a bit stream of data obtained by encoding a still picture frame.

With JPEG 2000, a bit stream must be constructed in order of resolution or order of layers. Accordingly, as shown in FIG. 30, in order to achieve a data structure in which moving picture part encoded data is collected in the first half of still picture frame encoded data and difference encoded data is collected in the second half of still picture frame encoded data, it is necessary, as shown in FIG. 31, to construct the bit stream in the order of the layers upon collecting, in high-order layers, bit planes (or moving picture part data) bearing an image quality identical with that of the moving picture frame in a subband bearing a resolution identical with that of the moving picture frame, and collecting data (namely difference data) other than this data in low-order layers.

For example, with the layer structure in a still picture frame according to this embodiment, two or more bit planes of lower order of LL, LH1, HL1, HH1 are stored in higher order layers (layers 0, 1, 2)), and one bit plane of lower order of LL, LH1, HL1, HH1 and all bit planes of LH2, HL2, HH2, LH3, LH3, HL3, HH3 are stored in lower order layers (layers 3 and 4).

These items of tile encoded data become frame encoded data in the frame encoded data generator 108 and the resultant data is written to the recording medium 1804 via the frame encoded data output unit 109 and recording unit 1803.

Thus, a digital camera having a special still picture taking capability according to this embodiment shares resolution and data in bit plane units between still and moving pictures, thereby making it possible to reduce storage-medium capacity needed to record moving pictures.

Other Embodiments

The above embodiments have been described with regard to a case were (resolution of moving picture frame)*(2")= (resolution of still picture frame) holds. However, the present invention is applicable also to a case where this relation does not hold. In a case where the relation does not hold, it will suffice to execute processing in conjunction with an appropriate resolution conversion processing and not just a discrete wavelet transform upon generating moving picture part data having a resolution identical with that of a moving picture frame from a still picture frame.

Further, a method of separating moving picture encoded data and difference encoded data and recording the data on a recording medium has been illustrated. However, these items of data may be recorded upon storing the data in a single data storage format. In such case the image decoding apparatus would implement a data storage method in which, when the moving picture is played back, the difference encoded data is skipped so that the data can be decoded as a moving picture correctly.

In the above embodiments, an image processing apparatus comprising a single device has been described. However, the present invention may be applied to a system constituted by a plurality of devices having equivalent functions.

Further, the image processing apparatus of the present invention need not have both an encoding device and a decoding device and can be implemented with only an encoding device or decoding device.

Furthermore, an arrangement having an image sensing capability is not essential; it is possible to adopt an arrangement in which the above encoding is performed pre-recorded image data.

It should be noted that the present invention also covers a case where software programs for implementing the functions of the above embodiments (programs corresponding to flowcharts described in the above embodiments) are supplied directly from a recording medium, or through use of wired/wireless communication, to a system or apparatus having a computer that is capable of executing the above-mentioned programs, and the system or apparatus executes the supplied programs to thereby implement the equivalent functions.

Accordingly, program code per se supplied to and installed in a computer in order that the computer may execute the processing of the present invention also implements the invention. In other words, the computer program that implements the processing of the present invention also is covered by the present invention.

In this case, so long as the system or apparatus has the functions of the program, the form of the program, e.g., object code, a program executed by an interpreter or script data supplied to an operating system, etc., does not matter.

Examples of recording media by which the program can be supplied are magnetic recording media such as floppy disk, hard disk and magnetic tape, optical/magneto-optical storage media such as a magneto-optical disk, CD-ROM, CD-R, CD-RW, DVD-ROM, DVD-R and DVD-RW, and a non-volatile semiconductor memory.

As for the method of supplying the program using wired/wireless communication, the computer program itself for forming the present invention in the server of a computer network, or a data file (program-data file) that can serve as a computer program for forming the present invention in a client computer, such as a compressed file having an automatic install function, can be stored and the program-data file can be downloaded to a connected client computer. In such case the program-data file can be divided into a plurality of segment files and the segment files can be deployed at different servers.

In other words, the present invention also covers a server apparatus that allows multiple users to download a program-data file for the purpose of implementing the functions of the present invention by computer.

Further, it is also possible to encrypt and store the program of the present invention on a storage medium such as a CD-ROM, distribute the storage medium to users, allow users who meet certain requirements to download decryption key information from, e.g., a website via the Internet, and allow these users to run the encrypted program by using the key information, whereby the program is installed in the user computer.

Furthermore, besides the case where the aforesaid functions according to the embodiments are implemented by executing the read program by computer, an operating system or the like running on the computer can perform all or a part of the actual processing based upon commands in the program so that the functions of the foregoing embodiments are be implemented by this processing.

Furthermore, after the program read from a recording medium is written to a function expansion board inserted into the computer or to a memory provided in a function expansion unit connected to the computer, a CPU or the like mounted on the function expansion board or function expansion unit can perform all or a part of the actual processing based upon commands in the program so that the functions of the foregoing embodiments can be implemented by this processing.

Thus, in accordance with the present invention, as described above, amount of encoded data can be reduced. For example, in a case where the present invention is applied to a digital camera or the like capable of recording a moving picture, the time for shooting a moving picture recordable on a storage medium can be prolonged (or the storage capacity of a storage medium needed to record a moving picture of a prescribed length of time can be reduced).

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus for encoding and decoding image data in which a still picture frame of an image quality higher than a prescribed imaging quality is mixed in moving picture data composed of successive moving picture frames having the prescribed imaging quality, comprising:

first encoding means for encoding the moving picture frames in the moving picture data and, with regard to the still picture frame in the moving picture data, generating moving picture part data, which has a quality equivalent to that of moving picture frames, from the still picture frame and encoding the moving picture part data, thereby generating moving picture encoded data;

second encoding means for encoding difference data, the difference data being the result of removing the moving picture part data from the still picture frame;

additional-information generating means for generating correspondence information and identification information, the correspondence information correlating the moving picture part data and corresponding difference data, and the identification information specifying the moving picture part data contained in the moving picture encoded data;

recording means for recording, on a storage medium, the moving picture frame encoded data, the difference encoded data, the correspondence information and the identification information as result of encoding the moving picture data;

a reproducing means for selectively reproducing the moving picture frames or the still image frame based on the encoding result recorded on the storage medium; and a decoding means for, when the reproducing means reproduces the still image frame, decoding only the moving picture part data specified by the identification information from all of the moving picture part data included in the moving picture frame encoded data and displaying the decoded image, wherein the decoding means further decodes, upon designated the decoded image by a user, based on the corresponding information, the difference encoded data corresponding to the moving picture part data associated with the designated decoded image and displays the decoded image.

2. The apparatus according to claim 1, wherein the imaging quality is at least one of number of pixels and signal-to-noise ratio.

3. The apparatus according to claim 1, wherein said first encoding means encodes the moving picture part data using quantization steps that differ from quantization steps used in encoding the moving picture frames.

4. The apparatus according to claim 1, further comprising moving picture data generating means for generating the moving picture data.

5. The apparatus according to claim 1, wherein the decoding means comprises:

first decoding means for decoding the moving picture frame encoded data and reproducing moving picture frames and moving picture part data; and second decoding means for decoding the difference encoded data, wherein the reproducing means comprises:

searching means, which is responsive to an externally entered command to display a still picture, for searching for the moving picture part data contained in the moving picture frame encoded data based upon the identification information; and still picture frame reproducing means for reproducing a still picture frame using the moving picture part data retrieved and difference data, which corresponds to this moving picture part data, retrieved based upon the identification information.

6. A computer-readable recording medium storing a computer program for causing a computer to function as the image processing apparatus as set forth in claim 5.

7. A computer-readable recording medium storing a computer program for causing a computer to function as the image processing apparatus set forth in claim 1.

8. An image processing method for encoding and decoding image data in which a still picture frame of an image quality higher than a prescribed imaging quality is mixed in moving picture data composed of successive moving picture frames having the prescribed imaging quality comprising:

a first encoding step of encoding the moving picture frames in the moving picture data and, with regard to the still picture frame in the moving picture data, generating moving picture part data, which has a quality equivalent to that of moving picture frames, from the still picture frame and encoding the moving picture part data, thereby generating moving picture encoded data;

a second encoding step of encoding difference data, the difference data being the result of removing the moving picture part data from the still picture frame;

an additional-information generating step of generating correspondence information and identification information, the correspondence information correlating the moving picture part data and corresponding difference data, and the identification information specifying the moving picture part data contained in the moving picture encoded data;

a recording step of recording, on a storage medium, the moving picture frame encoded data, the difference encoded data, the correspondence information and the identification information as result of encoding the moving picture data;

a reproducing step of selectively reproducing the moving picture frames or the still image frame based on the encoding result recorded on the storage medium; and a decoding step of, when the reproducing step reproduces the still image frame, decoding only the moving picture part data specified by the identification information from all of the moving picture part data included in the moving picture frame encoded data and displaying the decoded image, wherein the decoding step further decodes, upon designated the decoded image by a user, based on the corresponding information, the difference encoded data corresponding to the moving picture part data associated with the designated decoded image and displays the decoded image.

9. The method according to claim 8, wherein the imaging quality is at least one of number of pixels and signal-to-noise ratio.

10. The method according to claim 8 wherein said first encoding step encodes the moving picture part data using quantization steps that differ from quantization steps used in encoding the moving picture frames.

11. The method according to claim 8, further comprising a moving picture data generating step of generating the moving picture data.

12. The method according to claim 8, wherein the decoding step comprises:

a first decoding step of decoding the moving picture frame encoded data and reproducing moving picture frames and moving picture part data; and a second decoding step of decoding the difference encoded data, wherein the reproducing step comprises:

a searching step of searching, in response to an externally entered command to display a still picture, for the moving picture part data contained in the moving picture frame encoded data based upon the identification information; and a still picture frame reproducing step of reproducing a still picture frame using the moving picture part data retrieved and difference data, which corresponds to this moving picture part data, retrieved based upon the identification information.

* * * * *